(12) United States Patent
Bhanoo et al.

(10) Patent No.: US 8,364,959 B2
(45) Date of Patent: Jan. 29, 2013

(54) SYSTEMS AND METHODS FOR USING A DOMAIN-SPECIFIC SECURITY SANDBOX TO FACILITATE SECURE TRANSACTIONS

(75) Inventors: Hemant Madhav Bhanoo, San Francisco, CA (US); Luke Bayes, San Francisco, CA (US); Allan Stephan Mills, San Francisco, CA (US)

(73) Assignee: Google Inc., Mountain View, CA (US)

( * ) Notice: Subject to any disclaimer, the term of this patent is extended or adjusted under 35 U.S.C. 154(b) by 422 days.

(21) Appl. No.: 12/788,173

(22) Filed: May 26, 2010

(65) Prior Publication Data

US 2011/0296529 A1 Dec. 1, 2011

(51) Int. Cl.
*G06F 15/16* (2006.01)
*H04L 9/00* (2006.01)

(52) U.S. Cl. .......... 713/168; 713/180; 705/64; 709/203; 718/101

(58) Field of Classification Search .................. 713/168, 713/180; 705/64, 75, 77; 718/101; 709/203
See application file for complete search history.

(56) References Cited

U.S. PATENT DOCUMENTS

| | | | |
|---|---|---|---|
| 6,256,393 B1 * | 7/2001 | Safadi et al. .................. 380/232 |
| 7,069,271 B1 * | 6/2006 | Fadel et al. .................. 705/26.7 |
| 2002/0116341 A1 | 8/2002 | Hogan et al. | |
| 2004/0024641 A1 | 2/2004 | Cartwright | |
| 2004/0215964 A1 | 10/2004 | Barlow et al. | |
| 2004/0230797 A1 | 11/2004 | Ofek et al. | |
| 2006/0056284 A1 | 3/2006 | Wei et al. | |
| 2008/0034216 A1 | 2/2008 | Law | |
| 2009/0037914 A1 * | 2/2009 | Chagoly et al. ............... 718/101 |
| 2009/0048997 A1 | 2/2009 | Manickam et al. | |
| 2009/0070582 A1 | 3/2009 | Aura et al. | |
| 2009/0177544 A1 * | 7/2009 | Sugahara ........................ 705/14 |
| 2010/0017627 A1 | 1/2010 | Prineen et al. | |
| 2010/0023757 A1 | 1/2010 | Nguyen-Huu et al. | |
| 2011/0137797 A1 * | 6/2011 | Stals et al. ...................... 705/44 |
| 2011/0214115 A1 * | 9/2011 | Kuusilinna et al. ........... 717/171 |
| 2011/0246290 A1 * | 10/2011 | Howard et al. ............. 705/14.49 |

FOREIGN PATENT DOCUMENTS

WO WO 2011/150204 A2 12/2011

OTHER PUBLICATIONS

International Search Report and Written Opinion, dated Feb. 9, 2012, issued in a corresponding International application No. PCT/US2011/038133.

* cited by examiner

*Primary Examiner* — Beemnet Dada
*Assistant Examiner* — Thomas Gyorfi
(74) *Attorney, Agent, or Firm* — Johnson, Marcou & Isaacs, LLC

(57) ABSTRACT

Computer systems, methods, and computer readable media for facilitating a secure transaction are provided in which a client application is executed on a client computer. The client application initiates a request to a first domain comprising (i) a credential for the client application, (ii) a transaction identifier that uniquely identifies the request, and (iii) optionally, an identification of a user of the client application. Responsive to this request, the client receives a validated transaction module from the first domain. The client application loads the validated transaction module into a separate domain security sandbox that is segregated from memory space in which the client application is run. The validated transaction module conducts a validated transaction between the second domain and the validated transaction module. Separately, through the client application, a determination is made as to whether the transaction is complete by querying the first domain.

53 Claims, 7 Drawing Sheets

SYSTEMS AND METHODS FOR USING A DOMAIN-SPECIFIC SECURITY SANDBOX TO FACILITATE SECURE TRANSACTIONS

1. FIELD OF THE INVENTION

The present application relates generally to systems and methods for using a domain-specific security sandbox to facilitate secure transactions.

2. BACKGROUND

The number of potentially insecure applications running on client computers that, nevertheless, require secure real time transaction services, continues to grow. One non-limiting example of such applications are FLASH-based gaming applications that require replenishment of virtual currency in order to buy in-game upgrades like level unlocks, virtual equipment, virtual special weapons and cheats directly to gamers. Securing such real time transactions is needed in the art to protect users and application developers from fraudulent acquisition of account information, identity theft, and other forms of fraud.

One known method for securing such transactions is the concept of using a shared secret (secret key cryptography). Secret key cryptography involves the use of a single key. Given a message and the key, encryption produces unintelligible data which requires the key to decrypt. See, for example, Section 2.4 of Kaufman, *Network Security*, Prentice-Hall, Inc., Upper Saddle River, N.J., which is hereby incorporated by reference. However, the shared secret method does not work in instances where one of the applications is not secure. For example, many popular programming applications are executed by FLASH players and are not secure. Typically, when a shared secret algorithm is used, there is a remote web server calling a local web server. The secret is safe on the remote web server and the local web server and is not communicated between the two servers. This fails when the application is written in FLASH or other programs that are downloaded to a client computer and run, for example, within the client's browser. In the case of FLASH, when a user requests a FLASH application, a SWF file that contains bytecode that is interpreted by a FLASH player is downloaded to the client computer and run (interpreted) by a FLASH player within the client's browser. The bytecode in the SWF file can be inspected at the client computer to determine the secret. Thus, secrets cannot be contained within a FLASH SWF file.

Given the above background, what is needed in the art are improved systems and methods for authenticating electronic transactions originated from applications that may not be secure.

3. SUMMARY

The present disclosure addresses the needs in the art by making novel use of server cross-domain policies as well as domain-specific security sandboxes. There are two embodiments disclosed. In the first embodiment, a client application makes a request for a transaction module from a first domain that has an unrestrictive cross-domain policy. Once the client application receives the transaction module, it is executed in its own domain-specific security sandbox such that the source URL of the transaction module, the URL of the first domain, is preserved. The transaction module completes the transaction by interacting with a second domain that has a cross-domain policy that restricts interaction to those programs and processes whose source URL is the first domain.

The second embodiment takes the process a step further. In the second embodiment, responsive to a need to make an in-application secure transaction, a client application makes a first request associated with an in-application secure transaction. The first request is sent over the Internet or a computer network to a first domain that has an unrestrictive cross-domain policy. Responsive to this request, the first domain sends the client application a request module. Once the client application receives the request module, it is executed in its own domain-specific security sandbox (first sandbox) such that the source URL of the request module, the URL of the first domain, is preserved. The request module, operating in the first sandbox, makes a request for a transaction module from a second domain that has a cross-domain policy that restricts interaction to those programs and processes whose source URL is the first domain. The second domain sends the client application the transaction module. Once the client application receives the transaction module, the transaction module is executed in its own domain-specific security sandbox (second sandbox) such that the source URL of the transaction module, the URL of the second domain, is preserved. The transaction module completes the transaction by interacting with a third domain that has a cross-domain policy that restricts interaction to those programs and processes whose source URL is the second domain.

By exploiting cross-domain policies and the natural ability to run programs in their own domain-specific security sandboxes without the power for calling applications to introspect, the present disclosure provides highly secure systems, methods, and computer readable media for facilitating a secure in-application transaction.

First Embodiment from a Client Perspective.

One implementation of the first embodiment of the present disclosure, from a client perspective, comprises a computer system for facilitating a secure transaction. The computer system comprises one or more processing units and a memory, coupled to at least one of the one or more processing units. The memory stores instructions that are executed by at least one of the one or more processing units. For purposes of illustration, this computer system may be regarded as a client computer in which a client application is executed directly from a local data store associated with the computer system or that is executed from a remote client application server. In the embodiment, a request associated with a secure in-application transaction is generated through the client application, at a time when the client application is executing. The request comprises (i) a credential for the client application, (ii) a transaction identifier that uniquely identifies the request, and (iii) optionally, an identification of a user of the client application. The request for the secure in-application transaction is submitted over the Internet or a computer network to a first domain that has an unrestrictive first cross-domain policy. Responsive to this submission, a validated transaction module is received from the first domain. Accordingly, the source URL of the transaction module is identified as the first domain.

The client application executes the validated transaction module such that the validated transaction module is loaded into a separate domain-specific security sandbox within the memory of the computer system. The separate domain-specific security sandbox is segregated from memory space in the memory in which the client application is run. The separate domain-specific security sandbox is associated with, and limited to, programs that identify their source URL as being the first domain. The validated transaction module is executed such that the identity of the source URL of the validated transaction module is not altered or destroyed. Moreover, the validated transaction module does not grant the client application the power to introspect the validated transaction module.

The validated transaction module, while it is executing in the separate domain-specific security sandbox, issues a transaction call to a second domain. The second domain has a second cross-domain policy that limits interaction between the second domain and programs external to the second domain to those external programs whose source URL is the first domain. A validated transaction is conducted between the second domain and the validated transaction module.

The instructions further include instructions that are run concurrently with any or all of the above-identified processes, or after all of the above-identified processes have been run. Such instructions include instructions for determining, through the client application, by querying the first domain, whether the transaction was completed, thereby facilitating a secure transaction.

In some instances, the computer system further comprises a display having a screen real estate. In some such instances, the client application is manifested on a portion of the screen real estate and the validated transaction module is manifested on a subset of the portion of the screen real estate. This advantageously gives the user of the client application the impression that the in-application transaction is a seamless transaction that is being run from within the client application.

In some instances, the secure in-application transaction is an in-game transaction to buy an in-game upgrade using an account associated with the identity of the user. In some instances, the in-game upgrade is a level unlock, a purchase of virtual equipment, a purchase of a virtual special weapon, a purchase of a cheat, or a purchase of virtual currency. In some instances, the client application is a social networking application, a financial services application, an accounting application, or a tax preparation application.

In some instances, the first domain and the second domain are hosted by the same server that is accessible to the computer system over the Internet or the computer network. In other instances, the first domain and the second domain are each hosted by a separate server and are each accessible to the computer system over the Internet or the computer network.

In some instances, the client application is a FLASH application and the validated transaction module is a FLASH SWF application that is loaded by the client application.

First Embodiment from a Server Perspective.

The present disclosure also contemplates the above-identified first embodiment from the perspective of one or more servers that service a client. For instance, one such implementation of this server perspective provides a computer system comprising one or more processing units and a memory, coupled to at least one of the one or more processing units. The memory stores instructions that are executed by at least one of the one or more processing units. The memory comprises a first domain characterized by a first cross-domain policy that is unrestrictive, a second domain characterized by a second cross-domain policy that limits interaction between the second domain and programs external to the second domain to those external programs whose source URL is the first domain, a database of valid application credentials, a transaction database that is readable from the first domain and the second domain, and an unbranded transaction module.

In some instances, the computer system comprises a first computer and a second computer and the above-identified memory comprises memory resident in the first computer and memory resident in the second computer. In such instances, the first cross-domain policy, the database of valid application credentials, and the unbranded transaction module may be resident in the memory of the first computer while the second cross-domain policy may be resident in the memory of the second computer. Further, in such embodiments, access to the transaction database is possible from the first computer and the second computer. In some alternative instances, the computer system is a single computer.

The memory comprises instructions for receiving, at the first domain, over the Internet or a computer network, a request from a client application running on a client computer. The request is associated with a secure in-application transaction. The request comprises (i) a credential for the client application, (ii) an identification of a user of the client application, (ii) a transaction identifier that uniquely identifies the request, and (iii) optionally, an identification of a user of the client application. The memory comprises instructions for verifying the credential for the client application against the database of valid application credentials. The memory further comprises instructions for keying the request into the transaction database. The memory further comprises instructions for dynamically generating a validated transaction module. In one embodiment, one or more credentials are injected into the unbranded transaction module. Examples of such injection (security) methods are found in, for example, U.S. patent application Ser. No. 12/607,005, entitled "Systems and Methods for Authenticating an Electronic Transaction," filed Oct. 27, 2009, which is hereby incorporated by reference herein in its entirety. In other embodiments, disclosed herein, other methods are used to obtain parameters from the domain that provides the transaction module and these parameters serve to validate the transaction module.

The memory further comprises instructions for providing, from the first domain, the validated transaction module to the client computer. The memory further comprises instructions for receiving, at the second domain, a transaction call that originates from the validated transaction module executing on the client computer, where the source URL of the validated transaction module complies with the second cross-domain policy. The memory further comprises instructions for conducting a validated transaction between the second domain and the validated transaction module running on the client computer. The memory further comprises instructions for storing, at the second domain, a record of the completed transaction in the transaction database.

Concurrent to some or all of the above-mentioned processes, or after all of the above-mentioned processes are completed, additional processes are run. These processes include receiving, at the first domain, a query from the client application running on the client computer as to whether the transaction has been completed. The query includes the transaction identifier that uniquely identifies the request. These processes further include determining, at the first domain, by looking up the transaction identifier in the transaction database, whether the transaction has been completed. These processes further include notifying, responsive to the receiving and the determining, the client application running on the client computer of the status of the transaction.

In embodiments in which the computer system is divided into a first server and second server, the above-identified processes that are performed at or by the first domain are completed by the first server while the above-identified processes that are performed at or by the second domain are completed by the second server. One of skill in the art will appreciate that the first domain may comprise a first plurality of computers and the second domain may comprises a second plurality of computers. For instance, one server may be a mirror site to another server within a domain. In another example, one server may be a backup server to another server within a domain. In still another example, one domain may comprise a plurality of servers that handle a common load through conventional load balancing techniques. Those of skill in the art will appreciate that the present disclosure fully contemplates all of these different scenarios.

Second Embodiment from a Client Perspective.

One implementation of the second embodiment of the present disclosure, from a client perspective, comprises a computer system comprising one or more processing units and a memory coupled to at least one of the one or more processing units. The memory stores instructions that are executed by at least one of the one or more processing units. The instructions include instructions for executing a client application, where the client application is executed directly from a local data store or is executed from a remote client application server. The instructions include instructions for generating, through the client application, at a time when the client application is executing, a first request associated with a secure in-application transaction. The instructions include instructions for submitting the first request for the secure in-application transaction over the Internet or a computer network to a first domain that has an unrestrictive first cross-domain policy. The instructions further include instructions for receiving, responsive to the submitting, a request module, where the source URL of the request module is identified as the first domain.

The instructions further include instructions for causing the client application to execute the request module such that the request module is loaded into a first domain-specific security sandbox within the memory. The first domain-specific security sandbox is segregated from memory space in the memory in which the client application is run. The first domain-specific security sandbox is associated with, and limited to, programs that identify their source URL as being the first domain. The request module is executed such that the identity of the source URL of the request module is not altered or destroyed. The request module does not grant the client application the power to introspect the request module.

The instructions include instructions for generating, through the request module, at a time when the request application is executing, a second request associated with the secure in-application transaction. The second request comprises (i) a credential for the client application, (ii) a transaction identifier that uniquely identifies the second request, and (iii) optionally, an identification of a user of the client application. The instructions further include instructions for submitting the second request for the secure in-application transaction over the Internet or computer network to a second domain that has a second cross-domain policy that limits interaction between the second domain and programs external to the second domain to those external programs whose source URL is the first domain. The instructions further include instructions for receiving, responsive to the submitting, a transaction module from the second domain in which the source URL of the transaction module is identified as the second domain;

The instructions further include instructions for causing the client application to execute the transaction module such that the transaction module is loaded into a second domain-specific security sandbox within said memory. The second domain-specific security sandbox is segregated from memory space in the memory in which the client application is run, the second domain-specific security sandbox is associated with, and limited to, programs that identify their source URL as being the second domain. The transaction module is executed by the causing such that the identity of the source URL of the transaction module is not altered or destroyed. The transaction module does not grant the client application the power to introspect the validated transaction module;

The instructions further include instructions for issuing, from the transaction module while it is executing in the second domain-specific security sandbox, a transaction call to a third domain. The third domain has a cross-domain policy that limits interaction between the third domain and programs external to the third domain to those external programs whose source URL is the second domain. The instructions include instructions for conducting a validated transaction between the third domain and the transaction module.

The instructions further include instructions that are run concurrently with any or all of the above-identified processes, or after all of the above-identified processes have been run. Such instructions include instructions for determining, through the client application, by querying the first domain, whether the transaction was completed, thereby facilitating a secure transaction.

In some instances, the computer system further comprises a display having a screen real estate, where, upon execution of the client application, the client application is manifested on a portion of the screen real estate. In such instances, the validated transaction module is manifested on a subset of the portion of the screen real estate.

In some instances, the secure in-application transaction is an in-game transaction to buy an in-game upgrade using an account associated with the identity of the user. In some instances, the in-game upgrade is a level unlock, a purchase of virtual equipment, a purchase of a virtual special weapon, a purchase of a cheat, or a purchase of virtual currency. In some instances, the client application is a social networking application, a financial services application, an accounting application, or a tax preparation application.

In some instances, the first, second and third domain are each hosted by the same server that is accessible to the computer system over the Internet or the computer network. In some instances, the first, second, and third domain are each hosted by a separate server and are each accessible to the computer system over the Internet or the computer network. In some instances, the client application is a FLASH application and the validated transaction module is a FLASH SWF application that is loaded by the client application.

Second Embodiment from a Server Perspective.

The present disclosure also contemplates the above-identified second embodiment from the perspective of one or more servers that service a client. For instance, one such implementation of this server perspective provides a computer system for facilitating a secure transaction. The computer system comprises one or more processing units and a memory, coupled to at least one of the one or more processing units. The memory stores instructions that are executed by at least one of the one or more processing units.

The memory comprises a first domain characterized by a first cross-domain policy that is unrestrictive, a second domain characterized by a second cross-domain policy that limits interaction between the second domain and programs external to the second domain to those external programs whose source URL is the first domain, and a third domain characterized by a third cross-domain policy that limits interaction between the third domain and programs external to the third domain to those external programs whose source URL is the second domain. The memory further comprises a database of valid application credentials, a transaction database that is readable from the first domain, second and third domain, an unbranded transaction module, and a request module.

In some instances, the computer system comprises a first, second, and third computer and the above-identified memory comprises memory resident in the first computer, memory resident in the second computer, and memory resident in the third computer. In such instances, the first cross-domain policy and the request module may be resident in the memory of the first computer. The second cross-domain policy, the database of valid application credentials, and the unbranded transaction module may be resident in the memory of the second computer. The third cross-domain policy may be resident in the memory of the second computer. Further, in such embodiments, access to the transaction database is possible from the first computer, the second computer, and the third computer. In some alternative instances, the computer system is a single computer.

The memory comprises instructions for receiving, at the first domain, over the Internet or a computer network, a first request from a client application running on a client computer, where the first request is associated with a secure in-application transaction. The memory further comprises instructions for providing, from the first domain, the request module to the client computer. The memory comprises instructions for receiving, at the second domain, over the Internet or the computer network, a second request from the request module running on the client computer, where the second request is associated with the secure in-application transaction and where the second request comprises (i) a credential for the client application, (ii) a transaction identifier that uniquely identifies the request, and (iii) optionally, an identification of a user of the client application. In such instances, the source URL of the request module complies with the second cross-domain policy.

The memory further comprises instructions for verifying the credential for the client application against the database of valid application credentials. The memory further comprises instructions for keying the second request into the transaction database. The memory further comprises instructions for dynamically generating a validated transaction module. For instance, in some embodiments, the validated transaction is generated by injecting one or more credentials into the unbranded transaction module. Examples of such injection (security) methods are found in, for example, U.S. patent application Ser. No. 12/607,005, entitled "Systems and Methods for Authenticating an Electronic Transaction," filed Oct. 27, 2009, which is hereby incorporated by reference herein in its entirety. In other embodiments, disclosed herein, other methods are used to obtain parameters from the domain that provides the transaction module and these parameters serve to validate the transaction module. The memory further comprises instructions for providing, from the second domain, the validated transaction module to the client computer. The memory further comprises instructions for receiving, at the third domain, a transaction call that originates from the validated transaction module executing on the client computer, where the source URL of the validated transaction module complies with the third cross-domain policy. The memory further comprises instructions for conducting a validated transaction between the third domain and the validated transaction module running on the client computer. The memory further comprises instructions for storing, at the third domain, a record of the completed transaction in the transaction database.

Concurrent to some or all of the above-mentioned processes, or after all of the above-mentioned processes are completed, additional processes are run. These processes include receiving, at the first domain, a query from the client application running on the client computer as to whether the transaction has been completed. The query includes the transaction identifier that uniquely identifies the request. These processes further include determining, at the first domain, by looking up the transaction identifier in the transaction database, whether the transaction has been completed. These processes further include notifying, responsive to the receiving and the determining, the client application running on the client computer of the status of the transaction.

In some instances, the secure in-application transaction is an in-game transaction to buy an in-game upgrade using an account associated with the identity of the user. In some instances, the in-game upgrade is a level unlock, a purchase of virtual equipment, a purchase of a virtual special weapon, a purchase of a cheat, or a purchase of virtual currency. In some instances, the client application is a social networking application, a financial services application, an accounting application, or a tax preparation application.

In some instances, the first, second and third domain are hosted by the same server that is accessible to the client computer over the Internet or the computer network.

In some instances, the first domain is hosted by a first server, the second domain is hosted by a second server, and the third domain is hosted by a third server. The first, second and third server are each accessible to the client computer over the Internet or the computer network. In some such instances, the above-identified memory comprises a first memory resident in the first server, a second memory resident in the second server, and a third memory resident in the third server. In some such instances, the first cross-domain policy and the request module are resident in the first memory of the first server. In some such instances, the second cross-domain policy, the database of valid application credentials, and the unbranded transaction module are resident in the second memory of the second server. In some such instances, the third cross-domain policy is resident in the memory of the third server.

In some embodiments, the client application is a FLASH application and wherein the validated transaction module is a FLASH SWF application.

In embodiments in which the computer system is divided into a first, second, and third server, the above-identified processes that are performed at or by the first domain are completed by the first server, the above-identified processes that are performed at or by the second domain are completed by the second server, and the above-identified processes that are performed at or by the third domain are completed by the third server. One of skill in the art will appreciate that the first domain may comprise a first plurality of computers, the second domain may comprises a second plurality of computers, and the third domain may comprises a third plurality of computers. For instance, one server may be a mirror site to another server within a domain. In another example, one server may be a backup server to another server within a domain. In still another example, one domain may comprise a plurality of servers that handle a common load through conventional load balancing techniques. Those of skill in the art will appreciate that the present disclosure fully contemplates all of these different scenarios.

4. BRIEF DESCRIPTION OF THE DRAWINGS

Like reference numerals refer to corresponding parts throughout the several views of the drawings.

5. DETAILED DESCRIPTION

Figure 1:
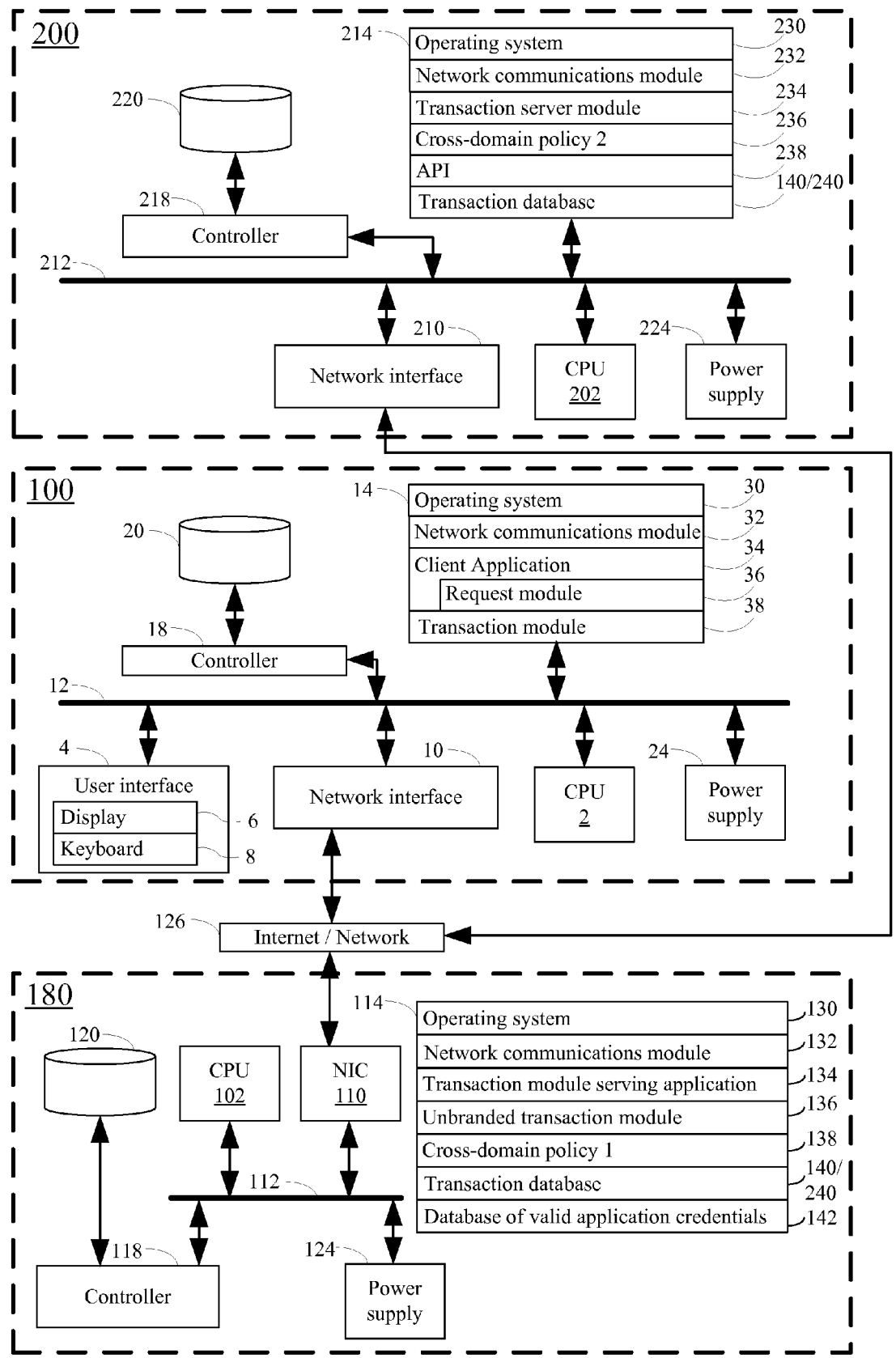
FIG. 1 illustrates a system in accordance with a first embodiment of the present disclosure.

The present disclosure details novel advances over known systems and methods for authenticating an electronic transaction that is communicated by application that is potentially not secure. The present disclosure makes use of server cross-domain policies as well as domain-specific security sandboxes. There are two embodiments disclosed. In the first embodiment, illustrated in FIGS. 1 and 2, a client application 34 makes a request for a transaction module 38 from a first domain 180 that has an unrestrictive cross-domain policy 138. Once the client application 34 receives the transaction module 38, it is executed in its own domain-specific security sandbox such that the source URL of the transaction module, the URL of the first domain 180, is preserved. The transaction module 38 completes the transaction by interacting with a second domain 200 that has a cross-domain policy 236 that restricts interaction to those programs and processes whose source URL is the first domain 180.

Figure 3A:
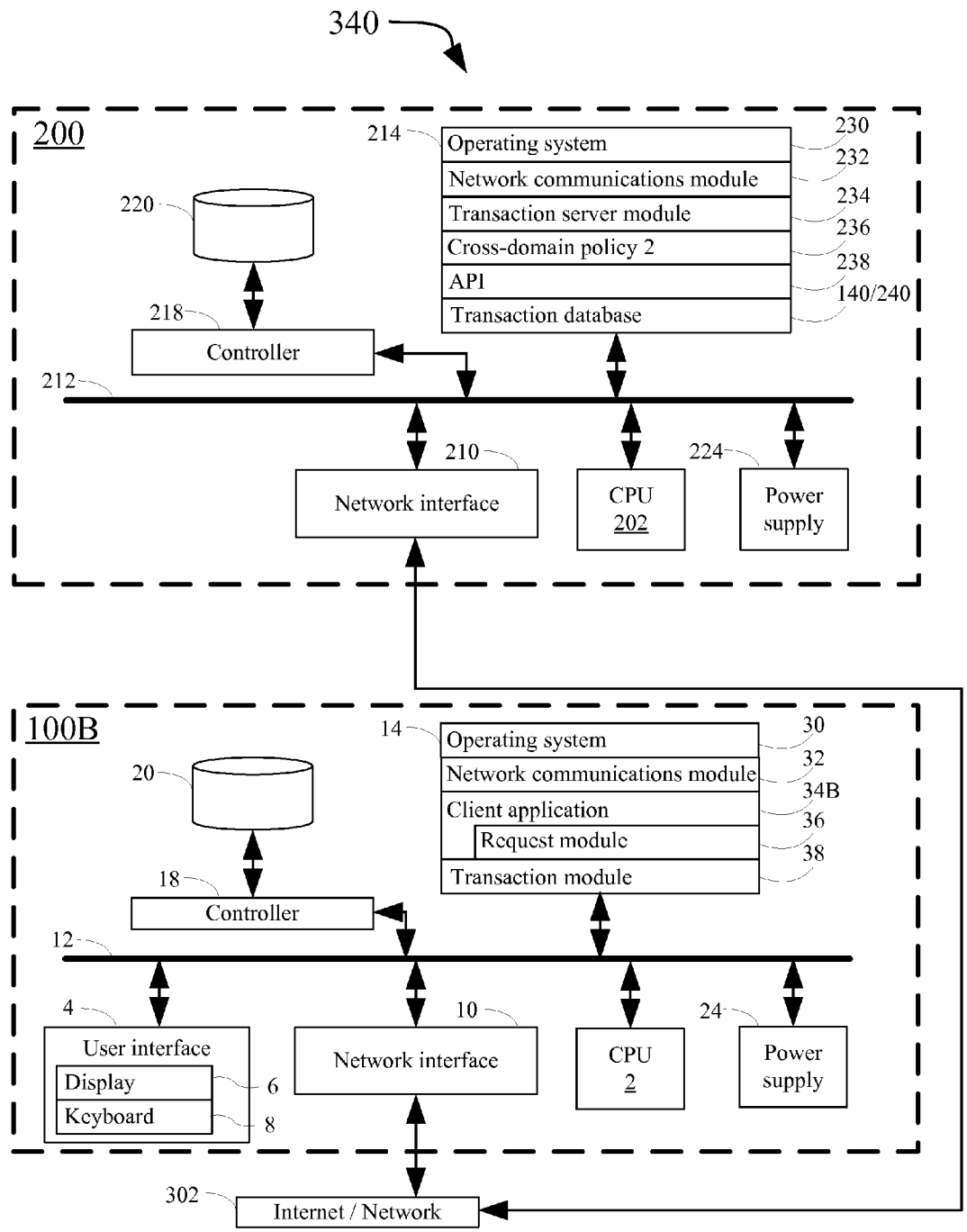
FIGS. 3A and 3B illustrate a system in accordance with a second embodiment of the present disclosure.
Figure 3B:
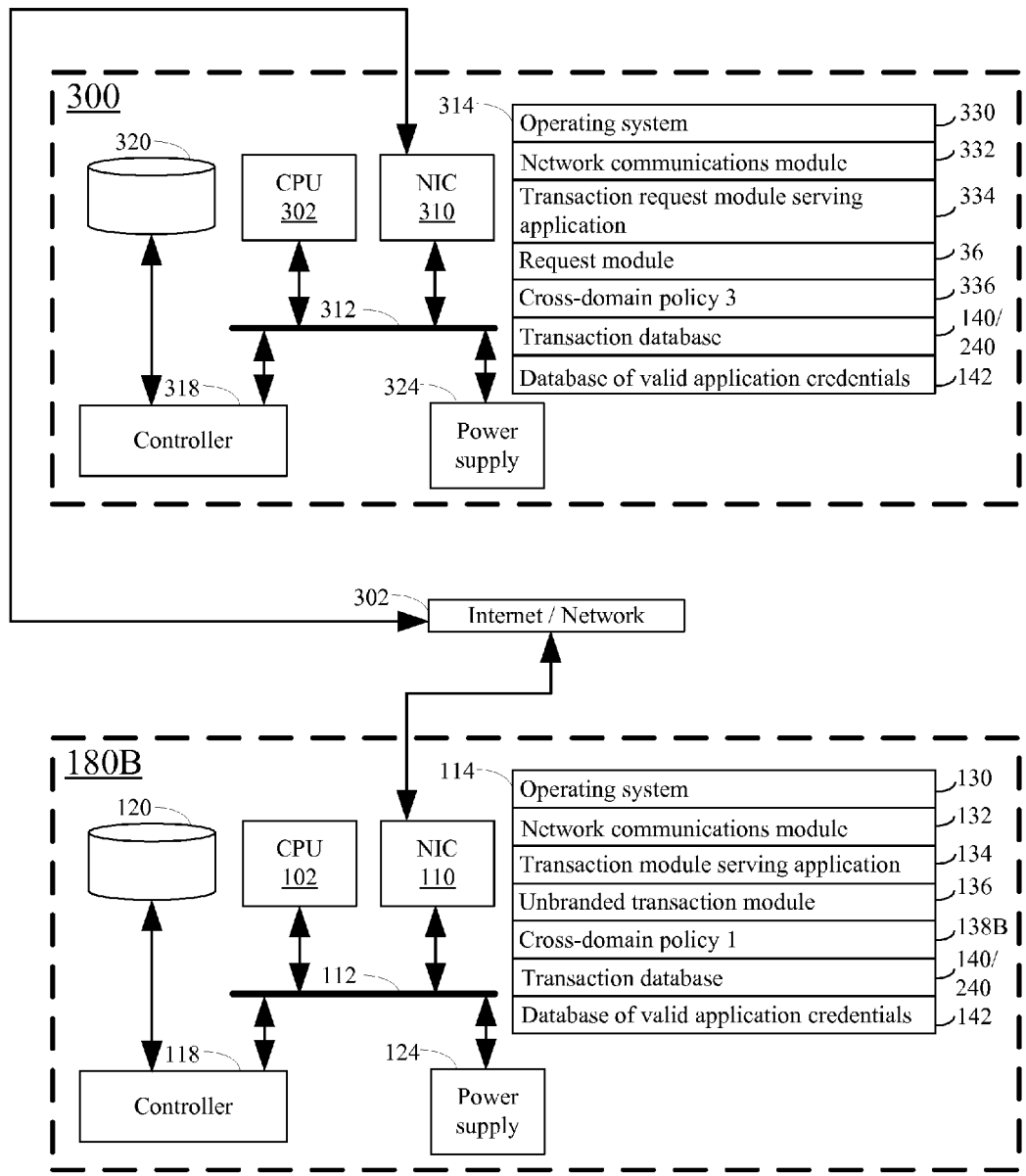
Figure 4A:
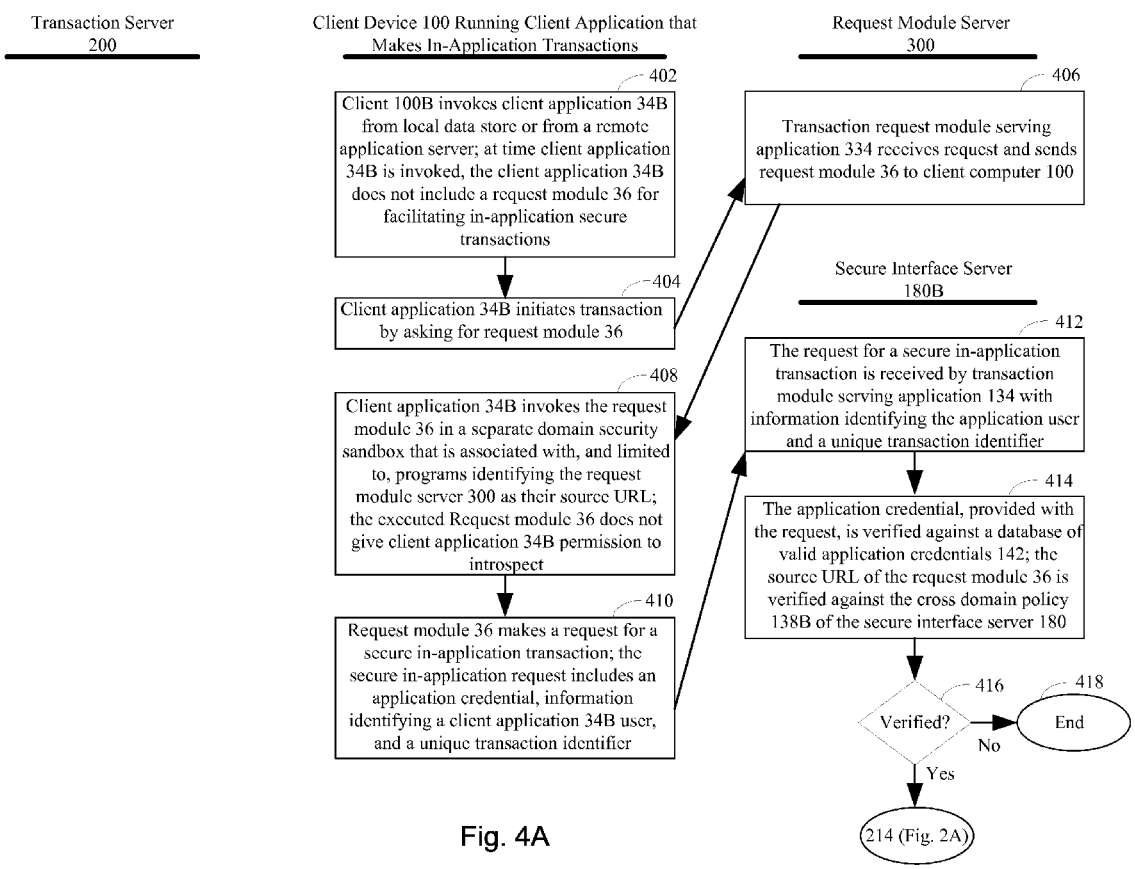
FIGS. 4A and 4B illustrate a method in accordance with the second embodiment of the present disclosure.
Figure 4B:
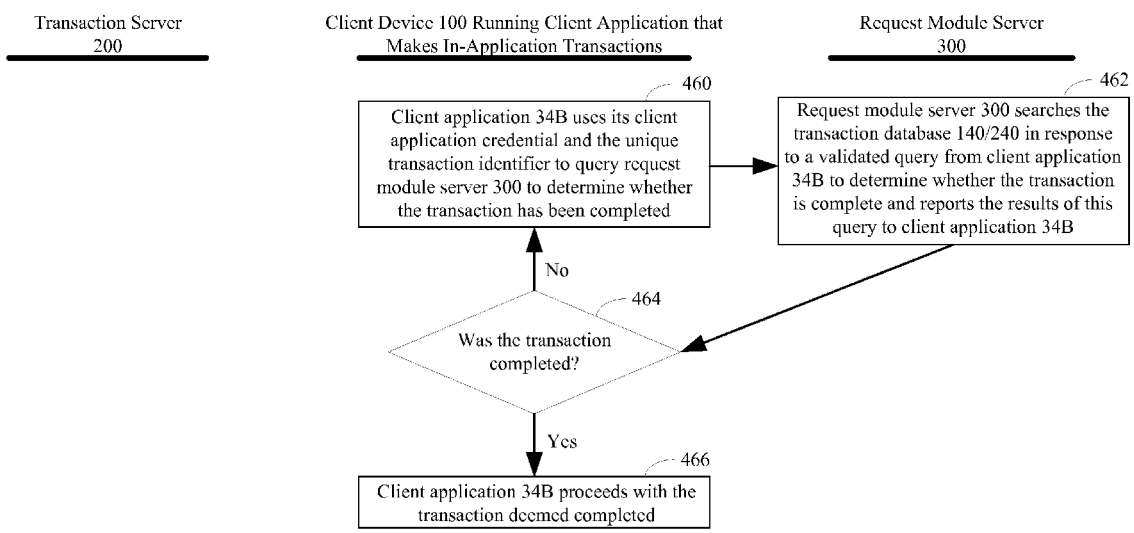

The second embodiment, illustrated in FIGS. 3 and 4, takes the process a step further. In the second embodiment, responsive to a need to make an in-application secure transaction, a client application 34B makes a first request that is associated with an in-application secure transaction. The first request is sent over the Internet or a computer network 302 to a first domain 300 (FIG. 3B) that has an unrestrictive cross-domain policy 336. Responsive to this request, the first domain 300 sends the client application 34B a request module 36. Once the client application 34B receives the request module 36, the request module 36 is executed in its own domain-specific security sandbox (first sandbox) such that the source URL of the request module 36, the URL of the first domain 300, is preserved. The request module 36, operating in the first sandbox, makes a request for a transaction module 38 from a second domain 180B that has a cross-domain policy 138B that restricts interaction to those programs and processes whose source URL is the first domain 300.

In some embodiments, upon receipt of the request for the transaction module from the client application 34B, the second domain 180B injects security information into an unbranded version of the transaction module 136, thereby forming secure transaction module 38, and sends the client application 34B the secure transaction module 38. Once the client application 34B receives the secure transaction module 38, the transaction module 38 is executed in its own domain-specific security sandbox (second sandbox) such that the source URL of the secure transaction module 38, the URL of the second domain 180, is preserved. The transaction module 38 completes the transaction by interacting with a third domain 200 that has a cross-domain policy 236 that restricts interaction to those programs and processes whose source URL is the second domain 180.

In some embodiments, the second domain 180B provides an unbranded version of transaction module 136 without modifying the content of the transaction module 136. In other words, in some embodiments, credentials are not necessarily injected into an unbranded version of the transaction module 136 to thereby form secure transaction module 38. In such embodiments, once the request module 36 receives the unbranded transaction module 136, it is able to validate the transaction module 136 with parameters provided by the second domain 180B. In this way, the request module 36 is able to validate the transaction module 136 (thereby allowing the transaction module 136 to be deemed transaction module 38 without injecting parameters into transaction module 136). Then, the transaction module 38 is executed in its own domain-specific security sandbox (second sandbox) such that the source URL of the secure transaction module 38, the URL of the second domain 180B, is preserved. The transaction module 38 completes the transaction by interacting with a third domain 200 that has a cross-domain policy 236 that restricts interaction to those programs and processes whose source URL is the second domain 180B.

By exploiting cross-domain policies and the natural ability to run programs in their own domain-specific security sandboxes without the power for calling applications to introspect, the present disclosure provides highly secure systems, methods, and computer readable media for facilitating a secure in-application transaction.

Figure 2A:
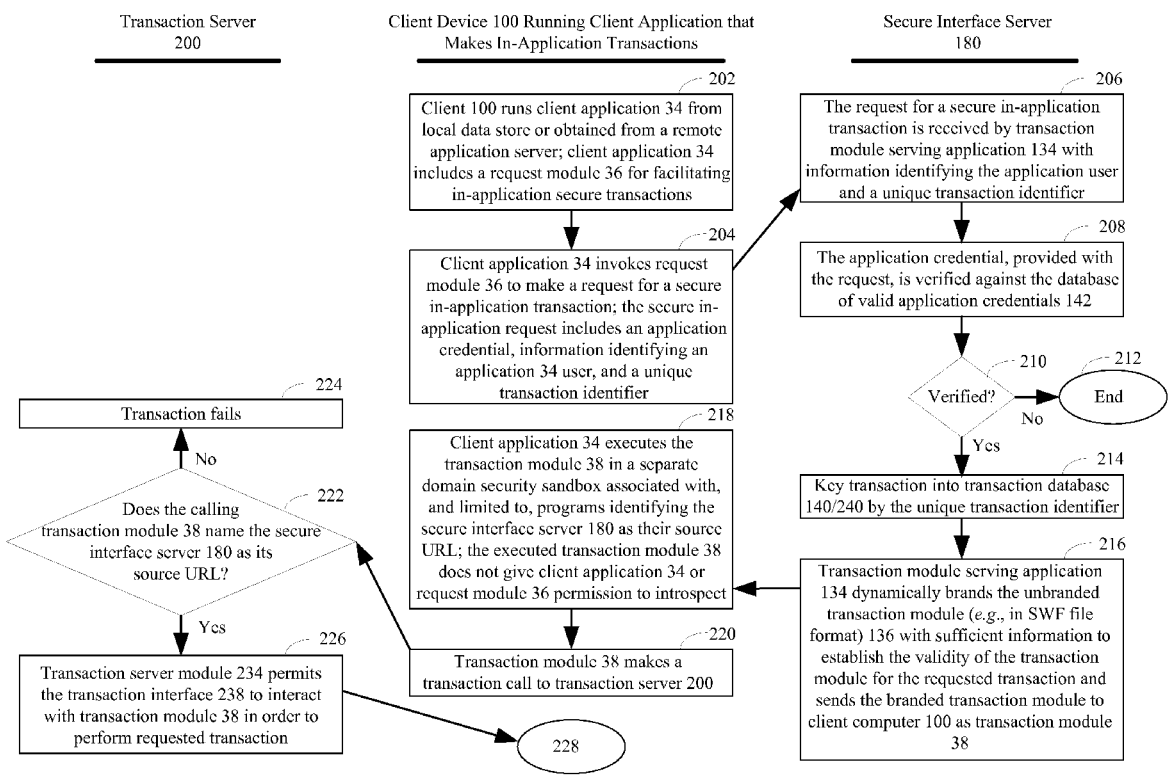
FIGS. 2A and 2B illustrate a method in accordance with the first embodiment of the present disclosure.

Now that an overview of the novel systems and methods for conducting secure in-application transactions have been disclosed, a more detailed description of a system in accordance with the first embodiment of the present disclosure is described in conjunction with FIG. 1. As such, FIG. 1 illustrates the topology of an environment in accordance with the present disclosure.

In the topology, there is a secure interface server 180, a client device 100, and a transaction server 200. Of course, other topologies are possible, for instance, the secure interface server 180 can in fact comprise several servers. Moreover, typically, there are hundreds, thousands, hundreds of thousands of client devices 100 or more. The exemplary topology shown in FIG. 1 merely serves to describe the features of the first embodiment of the present disclosure in a manner that will be readily understood to one of skill in the art.

The secure interface server 180 will typically have one or more processing units (CPU's) 102, a network or other communications interface 110, a memory 114, one or more magnetic disk storage and/or persistent devices 120 optionally accessed by one or more controllers 118, one or more communication busses 112 for interconnecting the aforementioned components, and a power supply 124 for powering the aforementioned components. Data in memory 114 can be seamlessly shared with non-volatile memory 120 using known computing techniques such as caching. Memory 114 and/or memory 120 can include mass storage that is remotely located with respect to the central processing unit(s) 102. In other words, some data stored in memory 114 and/or memory 120 may in fact be hosted on computers that are external to the secure interface server 180 but that can be electronically accessed by the secure interface server 180 over an Internet, intranet, or other form of network or electronic cable (illustrated as element 126 in FIG. 1) using network interface 110.

Memory 114 preferably stores:
- an operating system 130 that includes procedures for handling various basic system services and for performing hardware dependent tasks;
- a network communications module 132 that is used for connecting the secure interface server 180 to various client computers such as client devices 100 (FIG. 1) and possibly to other servers or computers (such as the transaction server 200) via one or more communication networks, such as the Internet, other wide area networks, local area networks (e.g., a local wireless network can connect the client devices 100 to the secure interface server 180), metropolitan area networks, and so on;
- a transaction module serving application 134 for receiving requests from client computers;

an unbranded transaction module 136 for distribution, upon user request, to a client device 100;

a cross-domain policy 138 that specifies which computers/domains that the secure interface server 180 may interact with;

a transaction database 140/240 for storing a record of secure in-application transactions; and a database of valid application credentials 142.

The secure interface server 180 is connected via Internet/network 126 to one or more client devices 100. FIG. 1 illustrates the connection to only one such the client device 100. It is possible for the client device 100 to be a personal computer (e.g., desktop or laptop computer) or any form of mobile computing device (e.g., an I-phone, Blackberry, and the like).

In typical embodiments, a client device 100 comprises:

one or more processing units (CPU's) 2;

a network or other communications interface 10;

a memory 14;

optionally, one or more magnetic disk storage and/or persistent storage devices 20 accessed by one or more optional controllers 18;

a user interface 4, the user interface 4 including a display 6 and a keyboard or keypad 8;

one or more communication busses 12 for interconnecting the aforementioned components; and a power supply 24 for powering the aforementioned components, which power supply can be, for example, batteries.

In some embodiments, data in memory 14 can be seamlessly shared with optional non-volatile memory 20 using known computing techniques such as caching. In some embodiments the client device 100 does not have a magnetic disk storage device. For instance, in some embodiments, the client device 100 is a portable handheld computing device and the network interface 10 communicates with the Internet/network 126 by wireless means.

The memory 14 preferably stores:

an operating system 30 that includes procedures for handling various basic system services and for performing hardware dependent tasks;

a network communication module 32 that is used for connecting client device 100 to other computers such as the secure interface server 180 and the transaction server 200, in some embodiments the network communication module 32 includes an optional web browser, such as Microsoft Internet Explorer versions 6.0 or later, Firefox 2.x, Firefox 3.x, AOL 9, Opera 9.5 or later, Safari 3.x, Chrome 2.0 or higher, and, in some embodiments, the optional web browser includes a module such as a FLASH player;

a client application 36 that can request an in-application transaction and that can verify that the in-application transaction was completed;

a request module 36 for initiating an in-application transaction; and a transaction module 38 for conducting an in-application transaction.

The transaction server 200 will typically have one or more processing units (CPU's) 202, a network or other communications interface 210, a memory 214, one or more magnetic disk storage and/or nonvolatile devices 220 optionally accessed by one or more optional controllers 218, one or more communication busses 212 for interconnecting the aforementioned components, and a power supply 224 for powering the aforementioned components. Data in memory 214 can be seamlessly shared with non-volatile memory 220 using known computing techniques such as caching. Memory 214 and/or memory 220 can include mass storage that is remotely located with respect to the central processing unit(s) 202. In other words, some data stored in memory 214 and/or memory 220 may in fact be hosted on computers that are external to the transaction server 200 but that can be electronically accessed by the transaction server 200 over an Internet, intranet, or other form of network or electronic cable (illustrated as element 126 in FIG. 1) using network interface 210.

The memory 214 preferably stores:

an operating system 230 that includes procedures for handling various basic system services and for performing hardware dependent tasks;

a network communications module 232 that is used for connecting the transaction server 200 to various client computers such as client devices 100 (FIG. 1) and possibly to other servers or computers (such as the secure interface server 180) via one or more communication networks, such as the Internet, other wide area networks, local area networks (e.g., a local wireless network can connect the client devices 100 to the secure interface server 180), metropolitan area networks, and so on;

transaction module 234 for verifying the validity of a request from a transaction module 38 operating on a client device 100;

a cross-domain policy 236 that specifies which computers/domains that the transaction server 200 may interact with;

an application programming interface "API" 238 for performing an in-application transaction with a transaction module 38 running on a client device 100; and a transaction database 140/240 for storing a status of a secure in-application transaction.

Figure 2B:
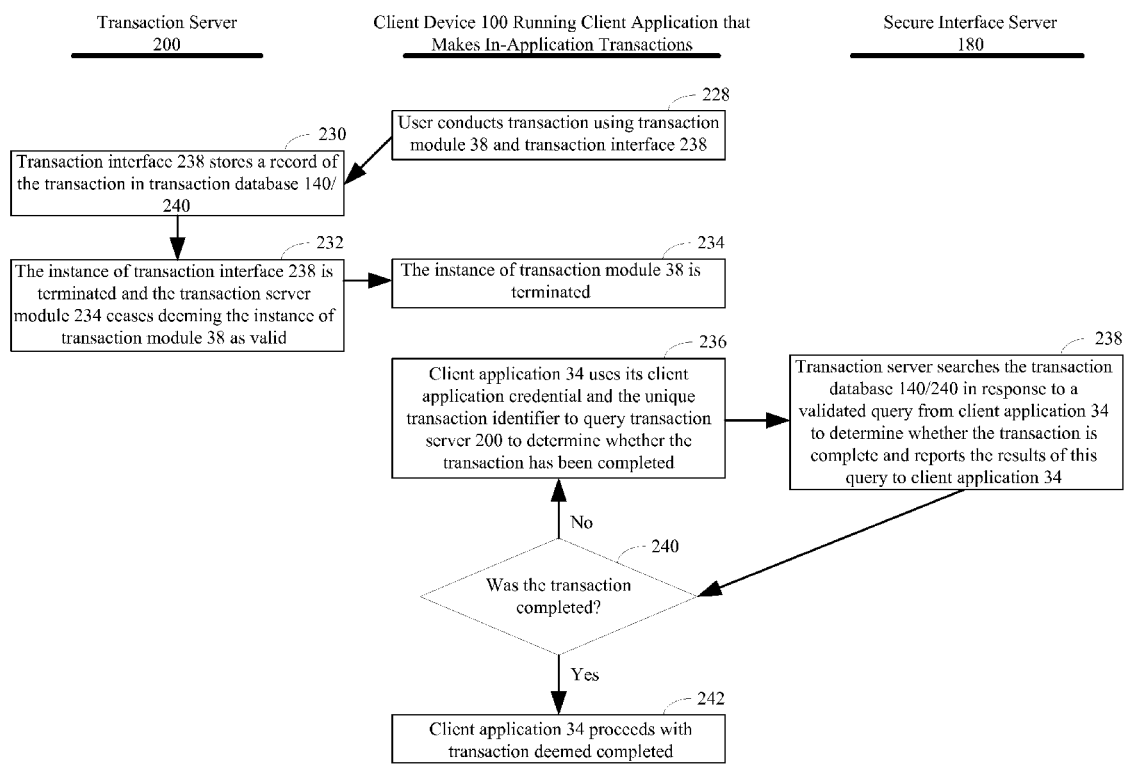

Referring to FIG. 2, an exemplary method in accordance with a first embodiment of the present disclosure is described. The method details the steps taken by a secure interface server 180, a client device 100, and a transaction server 200 to interactively service a transaction in accordance with the present disclosure.

Step 202.

In step 202, a client device 100 runs a client application 34 from a local data store (e.g., memory 14 or memory 20 of FIG. 1) or obtains and runs the client application 34 from a remote application server (not shown) over the Internet or computer network. In some embodiments, the client application 34 is a social networking application (e.g., FACEBOOK, MYSPACE), a financial services application, an accounting application, or a tax preparation application.

Step 204.

At some point while the client application 34 is running on the client device 100, the client application 34 invokes request module 36 to make a request for a secure in-application transaction. In some instances, the secure in-application transaction is an in-game transaction to buy an in-game upgrade using an account associated with the identity of a user of the client application. Examples of in-game upgrades include, but are not limited to, a level unlock, a purchase of virtual equipment, a purchase of a virtual special weapon, a purchase of a cheat, or a purchase of virtual currency.

Typically, the secure in-application request includes an application credential, information identifying a client application 34 user, and a unique transaction identifier. The application credential is a credential associated with the client application 34 that identifies the application developer. For instance, in some embodiments, the client application 34 is a game application and the application credential identifies the game application developer. The application credential can be used to determine who to credit an in-application transaction. For example, if the in-application transaction involves payment of funds by a user of the client application 34, the application credential is used to identify who is to be credited these funds. In general, the application credential is used to identify a first party to the in-application transaction. Similarly, information identifying the client application 34 user can be used to determine the second party to the in-application transaction. For example, typically, the second party is the user of the client application 34 who wishes to perform a secure in-application transaction mandated by the client application 34 in order to further a goal (e.g., an additional game level, more user features, etc.) that is made possible if the in-application transaction is completed. The unique transaction identifier is used to track the status of the in-application transaction. In typical embodiments, the format of the application credential, information identifying a client application 34 user, and a unique transaction identifier is predetermined in accordance with the requirements of the secure interface server 180 and/or the transaction server 200. For instance, the application credential may be a serial number provided to the application developer for use in all in-application transaction. Furthermore, the information identifying a client application 34 user may be registration information uniquely associated with the user that was created when the user created an account with the application developer and/or when the user created an account with the secure interface server 180 or the transaction server 200 and/or when the application developer registered the user with the secure interface server 180 or the transaction server 200. Regardless of implementation, the information identifying a client application 34 user uniquely identifies a user to the secure interface server 180 and/or the transaction server 200. Similarly, in preferred embodiments, the unique transaction identifier uniquely identifies a single in-application transaction conducted by a user of the client application 34.

Thus, in summary, upon completion of step 204, there is generated, through the client application 34 and the associated request module 36, at a time when the client application 34 is executing on the client device 100, a request associated with a secure in-application transaction, where the request comprises (i) a credential for the client application, (ii) an identification of a user of the client application, and (iii) a transaction identifier that uniquely identifies the request. The request for the secure in-application transaction is submitted over the Internet or a computer network to the secure interface server 180 (first domain) which has an unrestrictive first cross-domain policy 138.

Step 206.

In step 206, the request for the secure in-application transaction is received over the Internet or computer network by transaction module serving application 134, running on the secure interface server 180, with information identifying the application user, a unique transaction identifier, and the application credential. In some embodiments, the request received at step 206 does not include the identity of the user. In such embodiments, the identity of the user is only communicated by transaction module 38 to transaction server module 234 of the transaction server 200.

Step 208.

In step 208, the application credential for the client application 34 is verified against a database of valid application credentials 142. In some embodiments, the database of valid application credentials 142 comprises an identification of each legitimate application developer that may use the secure interface server 180 and the transaction server 200 to conduct secure transactions.

Step 210.

If the application credential provided with the application request received in step 206 is not verified 210—No, meaning that the application credential is not present in the database of valid application credentials 142 or the database indicates that the credential is invalid or inactivated, then the transaction ends 212. In some embodiments, not shown, the client application 34 is notified of this failure. In some embodiments, not shown, the application developer is notified of this failure. If the application credential provided with the application request received in step 206 is verified 210-Yes, meaning that the application credential is present in the database of valid application credentials 142, process control passes on to step 214.

Step 214.

In step 214, the request is keyed into the transaction database 140/240. In some embodiments, this involves adding a unique entry into the transaction database 140/240 for the disclosed single transaction. In some embodiments in which the request includes an identity of the user of the client application 34, the transaction entry is added to an account associated with this user. The transaction is not performed in step 214. For example, no sum of money is credited or debited to the user identified in the transaction during step 214. Such debiting or crediting, if it is to occur at all, occurs at later stages in the disclosed method. Transaction database 140/240 is accessible by both the secure interface server 180 and the transaction server 200. In some embodiments, the secure interface server 180 and the transaction server 200 are different servers. In some embodiments the secure interface server 180 and the transaction server 200 is the same server with separate cross-domain policies and domains.

Step 216.

In step 216, the transaction module serving application 134 dynamically brands the unbranded transaction module (e.g., in SWF file format) 136 with sufficient information to establish the validity of the transaction module for the requested transaction and sends the branded transaction module to client device 100 as transaction module 38. In some embodiments, this is accomplished by having the transaction module serving application 134 dynamically generate a validated transaction module 38 by injecting one or more credentials into the unbranded transaction module 136. Examples of such injection (security) methods are found in, for example, U.S. patent application Ser. No. 12/607,005, entitled "Systems and Methods for Authenticating an Electronic Transaction," filed Oct. 27, 2009, which is hereby incorporated by reference herein in its entirety.

In some embodiments, the second domain 180 provides a secure transaction module 38 to the request module 36 and/or client application 34 on client device 100 without modifying the content of the unbranded transaction module 136. In some such embodiments, the request for the transaction module that is sent to the secure interface server 180 from the client device 100 is serviced by providing an unbranded transaction module 136 along with parameters, external to the unbranded transaction module 136, that serve to validate the transaction module. The request module 36 is able to validate the transaction module 136 (thereby allowing the transaction module 136 to be deemed transaction module 38 without injecting parameters into transaction module 136). In some embodiments, a credential that is either injected into the transaction module 38 or that is provided as one or more parameters external to the transaction module is a user identifier key. In some embodiments, the application user identifier key is provided with the request received in step 206 originating from the client device 100. In some embodiments, the application user identifier key is associated with an account that the user has with the application developer and this account is serviced by the secure interface server 180 and the transaction server 200. In some embodiments, the application user identifier key is provided by a third party, such as FACEBOOK or MYSPACE.

In some embodiments, a credential that is injected into the transaction module 38 or that is provided as one or more parameters external to the transaction module is a salting value 146 based on a reference time. In some embodiments, this salting value is a Coordinated Universal Time (UTC) associated with request. For example, the salting value 146 may be UTC at a time during (e.g., at the beginning of, at the end of, at a time during) the exercise of step 202, step 204, step 206, step 208, step 210, step 214, or step 216 or some other predetermined function of the time when the request was either originated by client device 100 or received by the secure interface server 180. UTC is a time standard based on International Atomic Time (TAI) with leap seconds added at irregular intervals to compensate for the Earth's slowing rotation. Leap seconds are used to allow UTC to closely track UT1, which is mean solar time at the Royal Observatory, Greenwich. In some embodiments, the salting value 146 is the integer divide of UTC and some time increment, such as one hour, eight hours, twelve hours, or the like.

In some embodiments, a credential that is injected into the transaction module 38 or that is provided as one or more parameters external to the transaction module is a secret key that is shared by the secure interface server 180 and the transaction server 200. A feature of the secret key 148 is that it is not communicated across Internet/network 126 and only the application developer, the host of the transaction server 200, and the host of the secure interface server 180 know its identity. See, for example, Section 2.4 of Kaufman, *Network Security*, Prentice-Hall, Inc., Upper Saddle River, N.J., which is hereby incorporated by reference.

In some embodiments, a credential that is injected into the transaction module 38 or that is provided as one or more parameters external to the transaction module is the application user identifier provided with the request received in step 206. In some embodiments, any combination of the foregoing credentials is injected into the transaction module 38 prior to sending it to the client application 34 or that is provided as one or more parameters external to the transaction module. In some embodiments, any combination of the foregoing credentials are used to a generate the temporary signing key. For example, in some embodiments these credential are truncated together, or otherwise combined, and then one-way hashed to generate a signing key that is injected into the transaction module 38 rather than, or in addition to, injecting the foregoing credentials and/or providing them external to the transaction module. In some embodiments, other credentials, in addition to, or instead of the foregoing, are injected into the transaction module 38.

Step 218.

In step 218, the client application 34 executes the transaction module 38 in a separate domain-specific security sandbox associated with, and limited to, programs identifying the secure interface server 180 as their source URL. For example, in some embodiments, the client application 34 is a FLASH program and the transaction module 38 is in the form of a SWF file that is loaded and executed by the client application 34 during step 218. In such embodiments, the client application 34 interrogates the transaction module 38 to determine its source URL. In this instance, the source URL of transaction module 38 is the URL of the secure interface server 180. Thus, the client application 34 loads and executes the transaction module 38 in a domain-specific security sandbox that is dedicated to programs from the domain of secure interface server 180. In other words, during step 218, the client application 34 executes the validated transaction module 38 such that the validated transaction module is loaded into a separate domain-specific security sandbox within memory, where (i) the separate domain-specific security sandbox is segregated from memory space in said memory in which the client application is run, (ii) the separate domain-specific security sandbox is associated with, and limited to, programs that identify their source URL as being the domain of the secure interface server 180, (iii) the validated transaction module 38 is executed by the client application 34 such that the identity of the source URL of the validated transaction module 38 is not altered or destroyed, and (iv) the validated transaction module 38 does not grant the client application 34 the power to introspect the validated transaction module 38. Thus, advantageously, transaction module 38 is able to run in a secure manner on client device 100 even though it was loaded by client application 34. The client application 34 cannot introspect the transaction module 38. In other words, the client application 34 cannot read any values stored by the transaction module 38. This is highly advantageous because the user of the client application can enter sensitive information into the transaction module 38 without any risk of having the client application 34 obtain such sensitive information.

Step 220.

In step 220, transaction module 38 issues a transaction call while the module 38 is executing in the separate domain-specific security sandbox. The transaction call is issued to a second domain, that of the transaction server 200. The transaction server 200 has a second cross-domain policy 236 that limits interaction between the transaction server 200 and programs external to the transaction server 200 (second domain) to those external programs whose source URL is that of the secure interface server 180 (first domain).

Steps 222 and 224.

In step 222, a determination is made as to whether the calling transaction module 38 names the secure interface server 180 as its source URL. As described above in step 220, this is a necessary condition for interacting with the transaction server 200 because the cross-domain policy 236 of the transaction server 200 limits external interaction to only those programs whose source URL is that of the secure interface server 180. Because transaction module 38 was served by the secure interface server 180 to the client device 100, and loaded by the client application 34 in such a manner that the source URL of the transaction module 38 was preserved, the transaction module 38 should satisfy condition 222 (222-Yes) and thus process control should move to step 226. If the client application 34 attempted to load transaction module 38 in such a manner that the source URL of the transaction module 38 was not preserved (e.g., by using FLASH a loadBytes call) then, condition 222 will not be satisfied (222—No) and process control will pass to step 224 where the transaction will fail. In such instances, the record of the transaction will be removed from the transaction database 140/240.

Step 226.

If process control reaches step 226, the transaction server module 234 operating on the transaction server 200 permits API 238 to interact with the transaction module 38 in order to perform the requested transaction. In some embodiments, additional security measures are taken before the transaction commences. Examples of such security measures are disclosed in U.S. patent application Ser. No. 12/607,005, entitled "Systems and Methods for Authenticating an Electronic Transaction," filed Oct. 27, 2009, which is hereby incorporated by reference herein in its entirety. See, for example, steps 214 through 218 disclosed in U.S. patent application Ser. No. 12/607,005.

Step 228.

In step 228, a user conducts the transaction using transaction module 38 and API 238. During this transaction, the user may enter financial information or other forms of information such as credit card information, debit card information, ATM information (e.g., personal identification number), PAYPAL account information, automatic clearing house (ACH) transfer information, banking information, billing address information, mailing address information, personal information (e.g., social security number, date of birth, answers to personal questions, etc.), coupon information, rebate information, membership information, subscription information, login information, password information, security tokens (e.g., RSA challenge numbers) and the like. Advantageously, because transaction module 38 is operating in its own domain-specific security sandbox on the client device 100, the client application 34 and request module 36 cannot obtain the information entered by the user in step 228.

Step 230.

The information entered by the user in step 228 is processed by API 238 to thereby credit or debit the user. It will be appreciated that steps 228 and 230 may be repeated a number of times in order to complete the transaction. For example, API 238 may issue one or more challenges or requests from the user. The user, using transaction module 38, enters this information. If the user enters the correct challenge information, API 238 proceeds to later stages of the transaction by requesting more information from the user. Further, the status of the transaction is stored in transaction database 140/240 using the unique transaction identifier assigned to the transaction. It is to be noted that, in typical embodiments, both the transaction server 200 and the secure interface server 180 have access to transaction database 140/240. The secure interface server 180 creates an entry for the transaction in step 214 using the unique transaction identifier assigned to the transaction while the transaction server 200 records the status of the transaction (e.g., completed, failed, amount credited, amount debited etc.) during step 230.

Steps 232-234.

In preferred embodiments, the instance of API 238 is used for a single transaction. Thus, in such preferred embodiments, the instance of API 238 that was used to facilitate the transaction terminates. In other embodiments, API 238 is persistent across multiple transactions. Regardless of which form of embodiment is used, transaction server module 234 ceases deeming the instance of the transaction module 38 that it was interacting with in steps 226 and 230 as valid. This advantageously enhances the security of the discloses systems and methods since, in a worse case scenario, the transaction module 38 can only be used with a single user for a single, unique transaction. In step 234, the transaction module 38 is terminated.

Steps 236-242.

As noted above, the transaction module 38 operates in its own domain-specific security sandbox on the client device 100 and the transaction module 38 does not grant the client application 34 the power to introspect. Therefore, the client application 34 does not ascertain directly from the transaction module 38 whether the in-application transaction was completed, much less whether the in-application transaction was successfully completed such that the user is to be granted whatever privilege was associated with the in-application transaction (e.g., more game points, etc.). Therefore, concurrently with some or all of the aforementioned steps, or after all of the aforementioned steps have been completed, the client application 34 polls the transaction database 140/204 using the secure interface server 180 to determine the status of the transaction. It is to be appreciated that, while both the secure interface server 180 and the transaction server 200 have access to the transaction database 140/240, the secure interface server 180 has a permissive cross-domain policy 138 while the transaction server 200 has a restrictive cross-domain policy 236. Thus, unless the source URL of the client application 34 is the URL of the secure interface server 180, the client application 34 will be unable to interact directly with the transaction server 200. Thus, the client application 34 would be unable to poll the transaction database 140/240 using the transaction server 200.

In typical embodiments, the client application 34 polls the transaction database 140/240 on the secure interface server 180 on a periodic basis (e.g., every minute, every five minutes, every half hour, etc.) until the transaction database 140/240 indicates that the transaction is completed. In typical embodiments, this query is very limited. In typical embodiments, the client application 34 provides the unique transaction identifier and the application credential. If the application credential is valid against the database of valid application credentials 142, the status of the transaction uniquely associated with the transaction identifier provided by the client application 34 is sent back to the client application 34 running on the client over the Internet or computer network. In typical embodiments, the client application 34 is not permitted to obtain personal information from the transaction database 140/240.

Now that the details of the processing steps associated with an instance of the first embodiment have been disclosed, the advantages of the present application may be emphasized. A secure transaction may be performed using a client application in which the client application cannot gain knowledge of secure information needed to conduct the transaction. Nevertheless, using a unique transaction identifier for the transaction, the client application can determine whether the transaction was successful. Thus, using the disclosed system, the client application can support in-application transactions in a secure manner without having to set up the disclosed secure platform (e.g., secure internet server 180 and the transaction server 200). For example, the secure platform can be run by a separate entity. This reduces the costs for developing the client application.

In-Transaction User Interface.

In some embodiments, the look and feel of the in-application transaction is enhanced by creating the appearance that the transaction module 38 is controlled by the client application 34. In some embodiments, this is done through an application programming interface associated with the request module 36. The client application 34 uses the application programming interface to allocate a portion of the screen real estate being used by the client application 34 to open up the transaction module 38. In one example, the transaction module 38 is a 300 by 400 pixel interface and the client application 34, when making the transaction request, specifies the coordinates on the screen where this 300 by 400 pixel interface may open. Thus, advantageously, in such embodiments, even though the transaction module 38 is running in its own domain-specific security sandbox, the client application 34 and the transaction module 38 appear to be the same application. In some embodiments, the API interface associated with the request module 36 further includes parameters for specifying the fonts and colors used in the transaction module 38. Such parameters further the appearance that the client application and the transaction module 38 are the same application. In typical embodiments, client application 34 runs in its own window and all pixel coordinates provided to the transaction module 38 through the API of request module 36 are in reference to this window.

Secure Interface Server 180/Transaction Server 200.

In typical embodiments, as depicted in FIG. 1, the secure interface server 180 and the transaction server 200 are each a separate physical server. In some alternative embodiments, the secure interface server 180 and the transaction server 200 are hosted by the same physical server. In such embodiments, this physical server is accessible to the client device 100 over the Internet or a computer network 126.

SECOND EMBODIMENT

A second embodiment of the present disclosure is illustrated in FIGS. 3 and 4. In more detail, a system in accordance with the second embodiment of the present disclosure is described in conjunction with FIG. 3. As such, FIG. 3 illustrates the topology of an environment in accordance with the present disclosure. In the topology, there is a secure interface server 180B, a client device 100B, a transaction server 200, and a request module server 300. Of course, other topologies are possible, for instance, the secure interface server 180B can in fact comprise several servers. Moreover, typically, there are hundreds, thousands, hundreds of thousands of client devices 100B or more. The exemplary topology shown in FIG. 3 merely serves to describe the features of the second embodiment of the present disclosure in a manner that will be readily understood to one of skill in the art.

The client device 100B of FIG. 3A, and each of the modules hosted by the client device 100B are identical to their like-named counterparts in the client device 100 of FIG. 1A with the exception that, at the time the client application 34B of the client device 100B is invoked by the client device 100B, the client application 34B does not include the entirety of the request module 36.

The transaction server 200 of FIG. 3A, and each of the modules hosted by the transaction server 200 of FIG. 3A, are identical to their like-named counterparts in the transaction server 200 of FIG. 1A.

The secure interface server 180B of FIG. 3B, and each of the modules hosted by the secure interface server 180B are identical to their like-named counterparts in the secure interface server 180 of FIG. 1A with the exception that the cross-domain policy 138B of the secure interface server 180B (FIG. 3B) restricts interaction between the secure interface server 180B and those programs whose source URL is the domain of the request module server 300.

As illustrated in FIG. 3B, request module server 300 will typically have one or more processing units (CPU's) 302, a network or other communications interface 310, a memory 314, one or more magnetic disk storage and/or persistent devices 320 optionally accessed by one or more controllers 318, one or more communication busses 312 for interconnecting the aforementioned components, and a power supply 324 for powering the aforementioned components. Data in memory 314 can be seamlessly shared with non-volatile memory 320 using known computing techniques such as caching. Memory 314 and/or memory 320 can include mass storage that is remotely located with respect to the central processing unit(s) 302. In other words, some data stored in memory 314 and/or memory 320 may in fact be hosted on computers that are external to the request module server 300 but that can be electronically accessed by the request module server 300 over an Internet, intranet, or other form of network or electronic cable (illustrated as element 126 in FIG. 3B) using network interface 310.

Memory 314 preferably stores:
- an operating system 330 that includes procedures for handling various basic system services and for performing hardware dependent tasks;
- a network communications module 332 that is used for connecting the request module server 300 to various client computers such as the client devices 100 (FIG. 3A) and possibly to other servers or computers (such as the transaction server 200 and the secure interface server 180) via one or more communication networks, such as the Internet, other wide area networks, local area networks (e.g., a local wireless network can connect the client device 100 to the request module server 300), metropolitan area networks, and so on;
- a transaction request module serving application 334 for receiving requests from client device 100 and provided a request module 36 in response thereto;
- a cross-domain policy 336 that specifies which computers/domains that the request module server 300 may interact with;
- a transaction database 140/240 for storing a record of secure in-application transactions; and
- a database of valid application credentials 142.

Referring to FIG. 4, an exemplary method in accordance with the second embodiment of the present disclosure is described. The method details the steps taken by a secure interface server 180B, a client device 100, a transaction server 200, and a request module server 300 to interactively service a transaction in accordance with the second embodiment of the present disclosure.

Steps 402-406.

The method disclosed in FIG. 4 (embodiment 2) takes the method of FIG. 2 (embodiment 1) a step further by requiring that the client application 34B obtain the request module 36 from request module server 300 when the client application 34B is invoked. In the embodiment disclosed in FIG. 1, the client application 34B already had a copy of this request module 36. In some embodiments in which client application 34/34B is a FLASH application, the request module 36 is a compiled SWC file in embodiment 1 (FIG. 1) whereas in embodiment 2, the request module 36 is a SWF file.

In step 402, client device 100B invokes the client application 34B from local data store or from a remote application server. At the time client application 34B is invoked, the client application 34B does not include a request module 36 for facilitating in-application secure transactions. In step 404, the client application 34B initiates a transaction by asking for request module 36 from request module server 300. In step 406, responsive to the request of step 404, transaction request module serving application 334 processes the request and sends request module 36 to client device 100. In some embodiments of step 406, transaction request module serving application 334 only provides the request module 36 to the client application 34B if the client application 34B provides an application credential that the transaction request module serving application 334 verifies against the database of valid application credentials 142.

Step 408.

In step 408, the client application 34B executes the request module 36 in a separate domain-specific security sandbox (first sandbox) associated with, and limited to, programs identifying the request module server 300 as their source URL. For example, in some embodiments, the client application 34B is a FLASH program and the request module 36 is in the form of a SWF file that is loaded and executed by the client application 34B during step 408. In such embodiments, the client application 34B interrogates the request module 36 to determine its source URL. In this instance, the source URL of the request module 36 is the URL of the request module server 300. Thus, the client application 34B loads and executes the request module 36 in a domain-specific security sandbox that is dedicated to programs from the domain of the request module server 300. In other words, during step 408, the client application 34B executes the request module 36 such that the request module 36 is loaded into a separate domain-specific security sandbox within memory, where (i) the separate domain-specific security sandbox is segregated from memory space in the memory in which the client application 34B is run, (ii) the separate domain-specific security sandbox is associated with, and limited to, programs that identify their source URL as being the domain of the request module server 300, (iii) the request module 36 is executed by the client application 34B such that the identity of the source URL of the request module 36 is not altered or destroyed, and (iv) the request module does not grant the client application 34B the power to introspect the request module 36. Thus, advantageously, the request module 36 is able to run in a secure manner on the client device 100B even though it was loaded by the client application 34B. The client application 34B cannot introspect the request module 36. In other words, the client application 34B cannot read any values stored by the request module 36.

Step 410.

At some point while the client application 34B is running on the client device 100B, the client application 34B invokes request module 36 to make a request for a secure in-application transaction. Typically, the secure in-application request includes an application credential, information identifying a client application 34B user, and a unique transaction identifier. In typical embodiments, the format of the application credential, information identifying a client application 34B user, and a unique transaction identifier is predetermined in accordance with the requirements of the secure interface server 180B and/or the transaction server 200. Regardless of implementation, the information identifying a client application 34B user uniquely identifies a user to the secure interface server 180B and/or the transaction server 200 and/or request module server 300. Similarly, in preferred embodiments, the unique transaction identifier uniquely identifies a single in-application transaction conducted by a user of the client application 34B.

Thus, in summary, upon completion of step 410, there is generated, through the client application 34B and the associated request module 36, at a time when the client application 34B is executing on the client device 100B, a request associated with a secure in-application transaction, where the request comprises (i) a credential for the client application 34B, (ii) an identification of a user of the client application 34B, and (iii) a transaction identifier that uniquely identifies the request. The request for the secure in-application transaction is submitted over the Internet or a computer network to the secure interface server 180B. Here, unlike the first embodiment, the secure interface server 180B has a restrictive cross-domain policy 138B that requires applications that interact with the secure interface server 180B to have a source URL that is the domain of the request module server 300. In some embodiments, particularly those where the application credential was already presented to the request module server 300 in step 404, the request sent in step 410 and processed in step 412 may not have the application credential. In some embodiments, the request sent in step 410 and processed in step 412 may not have the identity of the user of the client application 34B.

Step 412.

As discussed above with reference to step 410, the request for the secure in-application transaction is received over the Internet or computer network by transaction module serving application 134, running on the secure interface server 180B, with information identifying the application user (optionally), a unique transaction identifier, and the application credential (optionally). In some embodiments, the request received at step 412 does not include the identity of the user. In such embodiments, the identity of the user is only communicated by transaction module 38B to the transaction server module 234 of the transaction server 200.

Step 414.

In some embodiments of step 414, the application credential for the client application 34B is verified against a database of valid application credentials 142. In some embodiments, this verification was already done in step 406. In some embodiments, this verification is done in both steps 414 and 406. In some embodiments, the database of valid application credentials 142 comprises an identification of each legitimate application developer that may use the secure interface server 180B and the transaction server 200 to conduct secure transactions. In step 414, an additional check is made to ensure that the source URL of the request module 36 is verified against the cross domain policy 138B of the secure interface server 180B.

Step 416.

If the application credential provided with the application request received in step 412 is not verified and/or the source URL of the request module 36 is not that of the domain of the request module server 300 (416—No), the transaction ends 418 in failure. In some embodiments, not shown, the client application 34B is notified of this failure. In some embodiments, not shown, the application developer is notified of this failure. If the application credential provided with the application request received in step 412 is verified and the source URL of the request application 36 is that of the domain of the request module server 300 (416-Yes), process control passes on to step 214 of FIG. 2A. In other words, the second embodiment includes steps 214 through 234 of the first embodiment.

Steps 460 through 466.

The transaction module 38 operates in its own domain-specific security sandbox on the client device 100B and the transaction module 38 does not grant the client application 34B the power to introspect. Therefore, the client application 34B does not ascertain directly from the transaction module 38 whether the in-application transaction was completed, much less whether the in-application transaction was successfully completed such that the user is to be granted whatever privilege was associated with the in-application transaction (e.g., more game points, etc.). Therefore, concurrently with some or all of the aforementioned steps, or after all of the aforementioned steps have been completed, the client application 34B polls the transaction database 140/204 using the request module server 300 to determine the status of the transaction.

It is to be appreciated that, while the secure interface server 180B, the transaction server 200, and the request module server 300 each have access to the transaction database 140/240, the request module server 300 has a permissive cross-domain policy 336 in embodiment 2 while the transaction server 200 has a restrictive cross-domain policy 236 and the secure interface server 180B has a restrictive cross-domain policy 138B. Thus, unless the source URL of the client application 34 is the URL of the secure interface server 180B, the client application 34B will be unable to interact directly with the transaction server 200. Moreover, unless the source URL of the client application 34 is the URL of the request module server 300, the client application 34B will be unable to interact directly with the secure interface server 180B. Thus, in such instances, the client application 34B would be unable to poll the transaction database 140/240 using the transaction server 200 or the secure interface server 180B In typical embodiments, the client application 34B poles the transaction database 140/240 on the request module server 300 on a periodic basis (e.g., every minute, every five minutes, every half hour, etc.) until the transaction database 140/240 indicates that the transaction is completed. In typical embodiments, this query is very limited. In typical embodiments, the client application 34B provides the unique transaction identifier and the application credential. If the application credential is valid against the database of valid application credentials 142, the status of the transaction uniquely associated with the transaction identifier provided by the client application 34B is sent back to the client application 34B running on the client device 100B over the Internet or computer network. In typical embodiments, the client application 34B is not permitted to obtain personal information from the transaction database 140/240.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a computer readable storage medium. For instance, the computer program product could contain the program modules shown in FIGS. 1 and/or 3. These program modules can be stored on a CD-ROM, DVD, magnetic disk storage product, or any other tangible computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed:

1. A computer system for facilitating a secure transaction, the computer system comprising:
   one or more processing units;
   a memory, coupled to at least one of the one or more processing units, the memory storing instructions that are executed by at least one of the one or more processing units, the instructions comprising:
   (A) executing a client application, wherein the client application is executed directly from a local data store or is executed from a remote client application server;
   (B) generating, through the client application, at a time when the client application is executing, a request associated with a secure in-application transaction, wherein the request comprises (i) a credential for the client application, (ii) a transaction identifier that uniquely identifies the request, and (iii) optionally, an identification of a user of the client application;
   (C) submitting the request for the secure in-application transaction over the Internet or a computer network to a first domain that has an unrestrictive first cross-domain policy;
   (D) receiving, responsive to the submitting (C), a validated transaction module from the first domain wherein the source URL of the transaction module is identified as the first domain;
   (E) causing the client application to execute the validated transaction module such that the validated transaction module is loaded into a separate domain security sandbox within said memory, wherein
      the separate domain security sandbox is segregated from memory space in said memory in which the client application is run,
      the separate domain security sandbox is associated with, and limited to, programs that identify their source URL as being the first domain,
      the validated transaction module is executed by the causing (E) such that the identity of the source URL of the validated transaction module is not altered or destroyed, and
      the validated transaction module does not grant the client application the power to introspect the validated transaction module;
   (F) issuing, from the validated transaction module while it is executing in the separate domain security sandbox, a transaction call to a second domain, wherein the second domain has a second cross-domain policy that limits interaction between the second domain and programs external to the second domain to those external programs whose source URL is the first domain;
   (G) conducting a validated transaction between the second domain and the validated transaction module; and
   (H) determining, through the client application, by querying the first domain, whether the transaction was completed, thereby facilitating a secure transaction.

2. The computer system of claim 1, the computer system further comprising a display having a screen real estate, wherein, upon the executing (A), the client application is manifested on a portion of said screen real estate and wherein the validated transaction module is manifested on a subset of said portion of said screen real estate.

3. The computer system of claim 1, wherein the secure in-application transaction is an in-game transaction to buy an in-game upgrade using an account associated with the identity of the user.

4. The computer system of claim 3, wherein the in-game upgrade is a level unlock, a purchase of virtual equipment, a purchase of a virtual special weapon, a purchase of a cheat, or a purchase of virtual currency.

5. The computer system of claim 1, wherein the client application is a social networking application, a financial services application, an accounting application, or a tax preparation application.

6. The computer system of claim 1, wherein the first domain and the second domain are hosted by the same server that is accessible to the computer system over the Internet or the computer network.

7. The computer system of claim 1, wherein the first domain and the second domain are each hosted by a separate server and are each accessible to the computer system over the Internet or the computer network.

8. The computer system of claim 1, wherein the client application is a FLASH application and wherein the validated transaction module is a FLASH SWF application that is loaded by the client application during the causing (E).

9. A method for facilitating a secure transaction comprising:
   (A) executing a client application on a suitably programmed computer, wherein the client application is executed directly from a local data store or is executed from a remote client application server;
   (B) generating on the suitably programmed computer, through the client application, at a time when the client application is executing, a request associated with a secure in-application transaction, wherein the request comprises (i) a credential for the client application, (ii) a transaction identifier that uniquely identifies the request, and (iii) optionally, an identification of a user of the client application;
   (C) submitting, from the suitably programmed computer, the request for the secure in-application transaction over the Internet or a computer network to a first domain that has an unrestrictive first cross-domain policy;
   (D) receiving, at the suitably programmed computer, responsive to the submitting (C), a validated transaction module from the first domain wherein the source URL of the transaction module is identified as the first domain;
   (E) causing, using the suitably programmed computer, the client application to execute the validated transaction module such that the validated transaction module is loaded into a separate domain security sandbox, wherein
      the separate domain security sandbox is segregated from memory space in which the client application is run,
      the separate domain security sandbox is associated with, and limited to, programs that identify their source URL as being the first domain,
      the validated transaction module is executed by the causing (E) such that the identity of the source URL of the validated transaction module is not altered or destroyed, and
      the validated transaction module does not grant the client application the power to introspect the validated transaction module;
   (F) issuing, from the validated transaction module while it is executing in the separate domain security sandbox of the suitably programmed computer, a transaction call to a second domain, wherein the second domain has a second cross-domain policy that limits interaction between the second domain and programs external to the second domain to those external programs whose source URL is the first domain;
   (G) conducting, using the suitably programmed computer, a validated transaction between the second domain and the validated transaction module; and
   (H) determining, through the client application running on the suitably programmed computer, by querying the first domain, whether the transaction was completed, thereby facilitating a secure transaction.

10. The method of claim 9, wherein, upon the executing (A), the client application is manifested on a portion of a screen real estate and wherein the validated transaction module is manifested on a subset of said portion of said screen real estate.

11. The method of claim 9, wherein the secure in-application transaction is an in-game transaction to buy an in-game upgrade using an account associated with the identity of the user.

12. The method of claim 11, wherein the in-game upgrade is a level unlock, a purchase of virtual equipment, a purchase of a virtual special weapon, a purchase of a cheat, or a purchase of virtual currency.

13. The method of claim 9, wherein the client application is a social networking application, a financial services application, an accounting application, or a tax preparation application.

14. The method of claim 9, wherein the first domain and the second domain are hosted by the same server.

15. The method of claim 9, wherein the first domain and the second domain are each hosted by a separate server.

16. The method of claim 9, wherein the client application is a FLASH application and wherein the validated transaction module is a FLASH SWF application that is loaded by the client application during the causing (E).

17. A computer program product for use in conjunction with a computer system, the computer program product comprising a non-transitory computer readable storage medium and a computer program mechanism embedded therein, the computer program mechanism for facilitating a secure transaction, the computer program mechanism comprising computer executable instructions for:
   (A) executing a client application on the computer system, wherein the client application is executed directly from a local data store or is executed from a remote client application server;
   (B) generating on the computer system, through the client application, at a time when the client application is executing, a request associated with a secure in-application transaction, wherein the request comprises (i) a credential for the client application, (ii) a transaction identifier that uniquely identifies the request, and (iii) optionally, an identification of a user of the client application;
   (C) submitting, from the computer system, the request for the secure in-application transaction over the Internet or a computer network to a first domain that has an unrestrictive first cross-domain policy;
   (D) receiving, at the computer system, responsive to the submitting (C), a validated transaction module from the first domain wherein the source URL of the transaction module is identified as the first domain;
   (E) causing, using the computer system, the client application to execute the validated transaction module such that the validated transaction module is loaded into a separate domain security sandbox, wherein
      the separate domain security sandbox is segregated from memory space in which the client application is run,
      the separate domain security sandbox is associated with, and limited to, programs that identify their source URL as being the first domain,
      the validated transaction module is executed by the causing (E) such that the identity of the source URL of the validated transaction module is not altered or destroyed, and
      the validated transaction module does not grant the client application the power to introspect the validated transaction module;
   (F) issuing, from the validated transaction module while it is executing in the separate domain security sandbox of the computer system, a transaction call to a second domain, wherein the second domain has a second cross-domain policy that limits interaction between the second domain and programs external to the second domain to those external programs whose source URL is the first domain;

(G) conducting, using the computer system, a validated transaction between the second domain and the validated transaction module; and (H) determining, through the client application running on the computer system, by querying the first domain, whether the transaction was completed, thereby facilitating a secure transaction.

18. A system comprising:

(A) means for executing a client application on a suitably programmed computer, wherein the client application is executed directly from a local data store or is executed from a remote client application server;

(B) means for generating on the suitably programmed computer, through the client application, at a time when the client application is executing, a request associated with a secure in-application transaction, wherein the request comprises (i) a credential for the client application, (ii) a transaction identifier that uniquely identifies the request, and (iii) optionally, an identification of a user of the client application;

(C) means for submitting, from the suitably programmed computer, the request for the secure in-application transaction over the Internet or a computer network to a first domain that has an unrestrictive first cross-domain policy;

(D) receiving, at the suitably programmed computer, responsive to the submitting (C), a validated transaction module from the first domain wherein the source URL of the transaction module is identified as the first domain;

(E) causing, using the suitably programmed computer, the client application to execute the validated transaction module such that the validated transaction module is loaded into a separate domain security sandbox, wherein
the separate domain security sandbox is segregated from memory space in which the client application is run,
the separate domain security sandbox is associated with, and limited to, programs that identify their source URL as being the first domain,
the validated transaction module is executed by the causing (E) such that the identity of the source URL of the validated transaction module is not altered or destroyed, and
the validated transaction module does not grant the client application the power to introspect the validated transaction module;

(F) issuing, from the validated transaction module while it is executing in the separate domain security sandbox of the suitably programmed computer, a transaction call to a second domain, wherein the second domain has a cross-domain policy that limits interaction between the second domain and programs external to the second domain to those external programs whose source URL is the first domain;

(G) conducting, using the suitably programmed computer, a validated transaction between the second domain and the validated transaction module; and (H) determining, through the client application running on the suitably programmed computer, by querying the first domain, whether the transaction was completed, thereby facilitating a secure transaction.

19. A computer system for facilitating a secure transaction, the computer system comprising:
one or more processing units;
a memory, coupled to at least one of the one or more processing units, the memory storing instructions that are executed by at least one of the one or more processing units, wherein the memory comprises:
a first domain characterized by a first cross-domain policy that is unrestrictive;
a second domain characterized by a second cross-domain policy that limits interaction between the second domain and programs external to the second domain to those external programs whose source URL is the first domain;
a database of valid application credentials;
a transaction database that is readable from the first domain and the second domain;
a transaction module; and
instructions for:

(A) receiving, at the first domain, over the Internet or a computer network, a request from a client application running on a client computer, wherein the request is associated with a secure in-application transaction and wherein the request comprises (i) a credential for the client application, (ii) a transaction identifier that uniquely identifies the request, and (iii) an identification of a user of the client application;

(B) verifying the credential for the client application against the database of valid application credentials;

(C) keying the request into the transaction database;

(D) providing, from the first domain, the transaction module to the client computer;

(E) receiving, at the second domain, a transaction call that originates from the transaction module executing on the client computer, wherein the source URL of the transaction module complies with the second cross-domain policy;

(F) conducting a validated transaction between the second domain and the transaction module running on the client computer;

(G) storing, at the second domain, a record of the completed transaction in the transaction database;

(H) receiving, at the first domain, a query from the client application running on the client computer as to whether the transaction has been completed, wherein the query includes the transaction identifier that uniquely identifies the request;

(I) determining, at the first domain, by looking up the transaction identifier in the transaction database, whether the transaction has been completed; and (J) notifying, responsive to the receiving (H) and the determining (I), the client application running on the client computer of the status of the transaction.

20. The computer system of claim 19, wherein the secure in-application transaction is an in-game transaction to buy an in-game upgrade using an account associated with the identity of the user.

21. The computer system of claim 20, wherein the in-game upgrade is a level unlock, a purchase of virtual equipment, a purchase of a virtual special weapon, a purchase of a cheat, or a purchase of virtual currency.

22. The computer system of claim 19, wherein the client application is a social networking application, a financial services application, an accounting application, or a tax preparation application.

23. The computer system of claim 19, wherein the first domain and the second domain are hosted by the same server that is accessible to the client computer over the Internet or the computer network.

24. The computer system of claim 19, wherein
the first domain is hosted by a first server,
the second domain is hosted by a second server,
the first server and the second server are each accessible to the client computer over the Internet or the computer network,
the memory comprises a first memory resident in the first server and a second memory resident in the second server,
the first cross-domain policy, the database of valid application credentials, and the unbranded transaction module are resident in the first memory of the first server,
the second cross-domain policy is resident in the memory of the second server, and
the first server and the second server each have access to the transaction database.

25. The computer system of claim 19, wherein the client application is a FLASH application and wherein the transaction module is a FLASH SWF application.

26. The computer system of claim 19, wherein the receiving (H), determining (I), and notifying (J) are repeated until the secure transaction is deemed completed.

27. A computer system for facilitating a secure transaction, the computer system comprising:
one or more processing units;
a memory, coupled to at least one of the one or more processing units, the memory storing instructions that are executed by at least one of the one or more processing units, the instructions comprising:
(A) executing a client application, wherein the client application is executed directly from a local data store or is executed from a remote client application server;
(B) generating, through the client application, at a time when the client application is executing, a first request associated with a secure in-application transaction;
(C) submitting the first request for the secure in-application transaction over the Internet or a computer network to a first domain that has an unrestrictive first cross-domain policy;
(D) receiving, responsive to the submitting (C), a request module, wherein the source URL of the request module is identified as the first domain;
(E) causing the client application to execute the request module such that the request module is loaded into a first domain security sandbox within said memory, wherein
the first domain security sandbox is segregated from memory space in said memory in which the client application is run,
the first domain security sandbox is associated with, and limited to, programs that identify their source URL as being the first domain,
the request module is executed by the causing (E) such that the identity of the source URL of the request module is not altered or destroyed, and
the request module does not grant the client application the power to introspect the request module;
(F) generating, through the request module, at a time when the request application is executing, a second request associated with the secure in-application transaction; wherein the second request comprises (i) a credential for the client application, (ii) a transaction identifier that uniquely identifies the second request, and (iii) optionally, an identification of a user of the client application;
(G) submitting the second request for the secure in-application transaction over the Internet or the computer network to a second domain that has a second cross-domain policy that limits interaction between the second domain and programs external to the second domain to those external programs whose source URL is the first domain;
(H) receiving, responsive to the submitting (G), a transaction module from the second domain wherein the source URL of the transaction module is identified as the second domain;
(I) causing the client application to execute the transaction module such that the transaction module is loaded into a second domain security sandbox within said memory, wherein
the second domain security sandbox is segregated from memory space in said memory in which the client application is run,
the second domain security sandbox is associated with, and limited to, programs that identify their source URL as being the second domain,
the transaction module is executed by the causing (I) such that the identity of the source URL of the transaction module is not altered or destroyed, and the transaction module does not grant the client application the power to introspect the transaction module;
(J) issuing, from the transaction module while it is executing in the second domain security sandbox, a transaction call to a third domain, wherein the third domain has a cross-domain policy that limits interaction between the third domain and programs external to the third domain to those external programs whose source URL is the second domain;
(K) conducting a validated transaction between the third domain and the transaction module; and
(L) determining, through the client application, by querying the first domain, whether the transaction was completed, thereby facilitating a secure transaction.

28. The computer system of claim 27, the computer system further comprising a display having a screen real estate, wherein, upon the executing (A), the client application is manifested on a portion of said screen real estate and wherein the transaction module is manifested on a subset of said portion of said screen real estate.

29. The computer system of claim 27, wherein the secure in-application transaction is an in-game transaction to buy an in-game upgrade using an account associated with the identity of the user.

30. The computer system of claim 29, wherein the in-game upgrade is a level unlock, a purchase of virtual equipment, a purchase of a virtual special weapon, a purchase of a cheat, or a purchase of virtual currency.

31. The computer system of claim 27, wherein the client application is a social networking application, a financial services application, an accounting application, or a tax preparation application.

32. The computer system of claim 27, wherein the first domain, the second domain, and the third domain are hosted by the same server that is accessible to the computer system over the Internet or the computer network.

33. The computer system of claim 27, wherein the first domain, the second domain, and the third domain are each hosted by a separate server and are each accessible to the computer system over the Internet or the computer network.

34. The computer system of claim 27, wherein the client application is a FLASH application and wherein the transaction module is a FLASH SWF application that is loaded by the client application during the causing (I).

35. A method for facilitating a secure transaction, the method comprising:
(A) executing a client application, on a suitably programmed computer, wherein the client application is executed directly from a local data store or is executed from a remote client application server;
(B) generating, through the client application, on the suitably programmed computer, at a time when the client application is executing, a first request associated with a secure in-application transaction;
(C) submitting, using the suitably programmed computer, the first request for the secure in-application transaction over the Internet or a computer network to a first domain that has an unrestrictive first cross-domain policy;
(D) receiving, at the suitably programmed computer, responsive to the submitting (C), a request module, wherein the source URL of the request module is identified as the first domain;
(E) causing the client application to execute, using the suitably programmed computer, the request module such that the request module is loaded into a first domain security sandbox, wherein
the first domain security sandbox is segregated from memory space in which the client application is run,
the first domain security sandbox is associated with, and limited to, programs that identify their source URL as being the first domain,
the request module is executed by the causing (E) such that the identity of the source URL of the request module is not altered or destroyed, and
the request module does not grant the client application the power to introspect the request module;
(F) generating, through the request module, using the suitably programmed computer, at a time when the request application is executing, a second request associated with the secure in-application transaction; wherein the second request comprises (i) a credential for the client application, (ii) a transaction identifier that uniquely identifies the second request, and (iii) optionally, an identification of a user of the client application;
(G) submitting, using the suitably programmed computer, the second request for the secure in-application transaction over the Internet or the computer network to a second domain that has a second cross-domain policy that limits interaction between the second domain and programs external to the second domain to those external programs whose source URL is the first domain;
(H) receiving, responsive to the submitting (G), at the suitably programmed computer, a transaction module from the second domain wherein the source URL of the transaction module is identified as the second domain;
(I) causing, using the suitably programmed computer, the client application to execute the transaction module such that the transaction module is loaded into a second domain security sandbox within said memory, wherein
the second domain security sandbox is segregated from memory space in said memory in which the client application is run,
the second domain security sandbox is associated with, and limited to, programs that identify their source URL as being the second domain,
the transaction module is executed by the causing (I) such that the identity of the source URL of the transaction module is not altered or destroyed, and the transaction module does not grant the client application the power to introspect the transaction module;
(J) issuing, using the suitably programmed computer, from the transaction module while it is executing in the second domain security sandbox, a transaction call to a third domain, wherein the third domain has a cross-domain policy that limits interaction between the third domain and programs external to the third domain to those external programs whose source URL is the second domain;
(K) conducting, using the suitably programmed computer, a validated transaction between the third domain and the transaction module; and
(L) determining, using the suitably programmed computer, through the client application, by querying the first domain, whether the transaction was completed, thereby facilitating a secure transaction.

36. The method of claim 35, wherein, upon the executing (A), the client application is manifested on a portion of a screen real estate and wherein the transaction module is manifested on a subset of said portion of said screen real estate.

37. The method of claim 35, wherein the secure in-application transaction is an in-game transaction to buy an in-game upgrade using an account associated with the identity of the user.

38. The method of claim 37, wherein the in-game upgrade is a level unlock, a purchase of virtual equipment, a purchase of a virtual special weapon, a purchase of a cheat, or a purchase of virtual currency.

39. The method of claim 35, wherein the client application is a social networking application, a financial services application, an accounting application, or a tax preparation application.

40. The method of claim 35, wherein the first domain, the second domain, and the third domain are hosted by the same server.

41. The method of claim 37, wherein the first domain and the second domain are each hosted by a separate server.

42. The method of claim 37, wherein the client application is a FLASH application and wherein the transaction module is a FLASH SWF application that is loaded by the client application during the causing (I).

43. A computer program product for use in conjunction with a computer system, the computer program product comprising a non-transitory computer readable storage medium and a computer program mechanism embedded therein, the computer program mechanism for facilitating a secure transaction, the computer program mechanism comprising computer executable instructions for:
(A) executing a client application, on said computer system, wherein the client application is executed directly from a local data store or is executed from a remote client application server;
(B) generating, through the client application, on the computer system, at a time when the client application is executing, a first request associated with a secure in-application transaction;
(C) submitting, using the computer system, the first request for the secure in-application transaction over the Internet or a computer network to a first domain that has an unrestrictive first cross-domain policy;
(D) receiving, at the computer system, responsive to the submitting (C), a request module, wherein the source URL of the request module is identified as the first domain;

(E) causing the client application to execute, using the computer system, the request module such that the request module is loaded into a first domain security sandbox,
   wherein the first domain security sandbox is segregated from memory space in which the client application is run,
   the first domain security sandbox is associated with, and limited to, programs that identify their source URL as being the first domain,
   the request module is executed by the causing (E) such that the identity of the source URL of the request module is not altered or destroyed, and
   the request module does not grant the client application the power to introspect the request module;
(F) generating, through the request module, using the computer system, at a time when the request application is executing, a second request associated with the secure in-application transaction; wherein the second request comprises (i) a credential for the client application, (ii) a transaction identifier that uniquely identifies the second request, and (iii) optionally, an identification of a user of the client application;
(G) submitting, using the computer system, the second request for the secure in-application transaction over the Internet or the computer network to a second domain that has a second cross-domain policy that limits interaction between the second domain and programs external to the second domain to those external programs whose source URL is the first domain;
(H) receiving, responsive to the submitting (G), at the computer system, a transaction module from the second domain wherein the source URL of the transaction module is identified as the second domain;
(I) causing, using the computer system, the client application to execute the transaction module such that the transaction module is loaded into a second domain security sandbox within said memory, wherein
   the second domain security sandbox is segregated from memory space in said memory in which the client application is run,
   the second domain security sandbox is associated with, and limited to, programs that identify their source URL as being the second domain,
   the transaction module is executed by the causing (I) such that the identity of the source URL of the transaction module is not altered or destroyed, and the transaction module does not grant the client application the power to introspect the transaction module;
(J) issuing, using the computer system, from the transaction module while it is executing in the second domain security sandbox, a transaction call to a third domain, wherein the third domain has a cross-domain policy that limits interaction between the third domain and programs external to the third domain to those external programs whose source URL is the second domain;
(K) conducting, using the computer system, a validated transaction between the third domain and the transaction module; and
(L) determining, using the computer system, through the client application, by querying the first domain, whether the transaction was completed, thereby facilitating a secure transaction.

44. A system comprising:
(A) means for executing a client application, on a suitably programmed computer, wherein the client application is executed directly from a local data store or is executed from a remote client application server;
(B) means for generating, through the client application, on the suitably programmed computer, at a time when the client application is executing, a first request associated with a secure in-application transaction;
(C) means for submitting, using the suitably programmed computer, the first request for the secure in-application transaction over the Internet or a computer network to a first domain that has an unrestrictive first cross-domain policy;
(D) means for receiving, at the suitably programmed computer, responsive to the submitting (C), a request module, wherein the source URL of the request module is identified as the first domain;
(E) means for causing the client application to execute, using the suitably programmed computer, the request module such that the request module is loaded into a first domain security sandbox, wherein
   the first domain security sandbox is segregated from memory space in which the client application is run,
   the first domain security sandbox is associated with, and limited to, programs that identify their source URL as being the first domain,
   the request module is executed by the means for causing (E) such that the identity of the source URL of the request module is not altered or destroyed, and
   the request module does not grant the client application the power to introspect the request module;
(F) means for generating, through the request module, using the suitably programmed computer, at a time when the request application is executing, a second request associated with the secure in-application transaction; wherein the second request comprises (i) a credential for the client application, (ii) a transaction identifier that uniquely identifies the second request, and (iii) optionally, an identification of a user of the client application;
(G) means for submitting, using the suitably programmed computer, the second request for the secure in-application transaction over the Internet or the computer network to a second domain that has a second cross-domain policy that limits interaction between the second domain and programs external to the second domain to those external programs whose source URL is the first domain;
(H) means for receiving, responsive to the means for submitting (G), at the suitably programmed computer, a transaction module from the second domain wherein the source URL of the transaction module is identified as the second domain;
(I) means for causing, using the suitably programmed computer, the client application to execute the transaction module such that the transaction module is loaded into a second domain security sandbox within said memory, wherein
   the second domain security sandbox is segregated from memory space in said memory in which the client application is run,
   the second domain security sandbox is associated with, and limited to, programs that identify their source URL as being the second domain,
   the transaction module is executed by the causing (I) such that the identity of the source URL of the transaction module is not altered or destroyed, and the transaction module does not grant the client application the power to introspect the validated transaction module;

(J) means for issuing, using the suitably programmed computer, from the transaction module while it is executing in the second domain security sandbox, a transaction call to a third domain, wherein the third domain has a cross-domain policy that limits interaction between the third domain and programs external to the third domain to those external programs whose source URL is the second domain;

(K) means for conducting, using the suitably programmed computer, a validated transaction between the third domain and the transaction module; and (L) means for determining, using the suitably programmed computer, through the client application, by querying the first domain, whether the transaction was completed, thereby facilitating a secure transaction.

45. A computer system for facilitating a secure transaction, the computer system comprising:
   one or more processing units;
   a memory, coupled to at least one of the one or more processing units, the memory storing instructions that are executed by at least one of the one or more processing units, wherein the memory comprises:
   a first domain characterized by a first cross-domain policy that is unrestrictive;
   a second domain characterized by a second cross-domain policy that limits interaction between the second domain and programs external to the second domain to those external programs whose source URL is the first domain;
   a third domain characterized by a third cross-domain policy that limits interaction between the third domain and programs external to the third domain to those external programs whose source URL is the second domain;
   a database of valid application credentials;
   a transaction database that is readable from the first domain, the second domain, and the third domain;
   a request module;
   a transaction module; and
   instructions for:
   (A) receiving, at the first domain, over the Internet or a computer network, a first request from a client application running on a client computer, wherein the first request is associated with a secure in-application transaction;
   (B) providing, from the first domain, the request module to the client computer;
   (C) receiving, at the second domain, over the Internet or the computer network, a second request from the request module running on the client computer, wherein the second request is associated with the secure in-application transaction and wherein the second request comprises (i) a credential for the client application, (ii) a transaction identifier that uniquely identifies the request, and (iii) optionally, an identification of a user of the client application, wherein the source URL of the request module complies with the second cross-domain policy;
   (D) verifying the credential for the client application against the database of valid application credentials;
   (E) keying the second request into the transaction database;
   (F) providing, from the second domain, the transaction module to the client computer;
   (G) receiving, at the third domain, a transaction call that originates from the transaction module executing on the client computer, wherein the source URL of the validated transaction module complies with the third cross-domain policy;
   (H) conducting a validated transaction between the third domain and the transaction module running on the client computer;
   (I) storing, at the third domain, a record of the completed transaction in the transaction database;
   (J) receiving, at the first domain, a query from the client application running on the client computer as to whether the transaction has been completed, wherein the query includes the transaction identifier that uniquely identifies the request;
   (K) determining, at the first domain, by looking up the transaction identifier in the transaction database, whether the transaction has been completed; and
   (L) notifying, responsive to the receiving (J) and the determining (K), the client application running on the client computer of the status of the transaction.

46. The computer system of claim 45, wherein the secure in-application transaction is an in-game transaction to buy an in-game upgrade using an account associated with the identity of the user.

47. The computer system of claim 46, wherein the in-game upgrade is a level unlock, a purchase of virtual equipment, a purchase of a virtual special weapon, a purchase of a cheat, or a purchase of virtual currency.

48. The computer system of claim 45, wherein the client application is a social networking application, a financial services application, an accounting application, or a tax preparation application.

49. The computer system of claim 45, wherein the first domain, the second domain, and the third domain are hosted by the same server that is accessible to the client computer over the Internet or the computer network.

50. The computer system of claim 45, wherein the first domain, the second domain, and the third domain are each hosted by a separate server and are each accessible to the client computer over the Internet of the computer network.

51. The computer system of claim 45, wherein
   the first domain is hosted by a first server,
   the second domain is hosted by a second server,
   the third domain is hosted by a third server,
   the first server, the second server, and the third server are each accessible to the client computer over the Internet or the computer network,
   the memory comprises a first memory resident in the first server, a second memory resident in the second server, and a third memory resident in the third server,
   the first cross-domain policy and the request module are resident in the first memory of the first server,
   the second cross-domain policy, the database of valid application credentials, and the unbranded transaction module are resident in the second memory of the second server, and
   the third cross-domain policy is resident in the memory of the third server.

52. The computer system of claim 45, wherein the client application is a FLASH application and wherein the validated transaction module is a FLASH SWF application.

53. The computer system of claim 45, wherein the receiving (J), determining (K), and notifying (L) are repeated until the secure transaction is deemed completed.

* * * * *